United States Patent
Kotani

(10) Patent No.: US 8,254,213 B2
(45) Date of Patent: Aug. 28, 2012

(54) NEAR-FIELD LIGHT GENERATING DEVICE AND OPTICALLY-ASSISTED MAGNETIC RECORDING DEVICE WITH ABSORBING WAVEGUIDE

(75) Inventor: Teruhisa Kotani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 328 days.

(21) Appl. No.: 12/576,009

(22) Filed: Oct. 8, 2009

(65) Prior Publication Data

US 2010/0128577 A1     May 27, 2010

(30) Foreign Application Priority Data

Nov. 21, 2008    (JP) ................................. 2008-297894

(51) Int. Cl.
*G11B 11/00* (2006.01)
(52) U.S. Cl. ............. 369/13.33; 369/13.13; 360/59
(58) Field of Classification Search ............... 369/13.33, 369/13.13, 13.32, 13.02, 112.09, 112.14, 369/112.21, 112.27; 360/59; 385/129, 31, 385/88–94; 250/201.3, 201.5
See application file for complete search history.

(56) References Cited

U.S. PATENT DOCUMENTS

| | | | |
|---|---|---|---|
| 7,547,868 B2 | 6/2009 | Hongo et al. | |
| 2005/0213436 A1* | 9/2005 | Ono et al. ................. | 369/13.02 |
| 2008/0080039 A1 | 4/2008 | Hongo et al. | |
| 2010/0172220 A1* | 7/2010 | Komura et al. ............ | 369/13.33 |
| 2011/0002199 A1* | 1/2011 | Takayama et al. ......... | 369/13.24 |
| 2011/0026377 A1* | 2/2011 | Shimazawa et al. ....... | 369/13.24 |
| 2011/0096639 A1* | 4/2011 | Matsumoto ................ | 369/13.33 |
| 2011/0122737 A1* | 5/2011 | Shimazawa et al. ....... | 369/13.24 |
| 2011/0128827 A1* | 6/2011 | Shimazawa et al. ....... | 369/13.02 |

FOREIGN PATENT DOCUMENTS

| | | |
|---|---|---|
| JP | 5-129728 A | 5/1993 |
| JP | 2002-270934 A | 9/2002 |
| JP | 2006-120294 A | 5/2006 |

OTHER PUBLICATIONS

Hongo et al., "Lensless Surface Plasmon Head with 1 Tbit/in.2 Recording Density", Japanese Journal of Applied Physics, vol. 47, No. 7, 2008, pp. 6000-6006.

* cited by examiner

*Primary Examiner* — Tan X Dinh
(74) *Attorney, Agent, or Firm* — Birch, Stewart, Kolasch & Birch, LLP

(57) ABSTRACT

A near-field light generating device includes a substrate, a semiconductor laser device, a light absorbing device, and a near-field light generator. The semiconductor laser device is formed on the substrate and emits the laser light polarized in a first direction. The light absorbing device is formed on the substrate to be close to a light emission part of the semiconductor laser device and absorbs light polarized in a second direction orthogonal to the first direction. The near-field light generator is formed on the substrate to be close to a light emission part of the light absorbing device.

7 Claims, 21 Drawing Sheets

FIG. 19       CONVENTIONAL ART

NEAR-FIELD LIGHT GENERATING DEVICE AND OPTICALLY-ASSISTED MAGNETIC RECORDING DEVICE WITH ABSORBING WAVEGUIDE

BACKGROUND OF THE INVENTION

1 Field of the Invention

The present invention relates to a near-field light generating device generating near-field light and an optically-assisted magnetic recording device including the same.

2 Description of the Related Art

Owing to the recent progress of the information society, much attention has been paid to mass storage systems such as hard disc drives which are magnetic recording reproduction systems and optical disc drives which are optical recording reproduction systems.

A magnetic recording reproduction system records information by means of a direction of magnetization of a magnetic bit which is the minimum unit of recording on a recording medium. Provided that the magnetic anisotropic energy of the magnetic material is Ku and the volume of the magnetic material is V, the magnetic energy required for the magnetization reversal of a magnetic bit is represented by Ku·V. In other words, the higher the magnetic energy Ku·V is, the higher the energy required for the magnetization reversal of a magnetic bit is.

As the recording density is increased in order to increase the capacity of a magnetic recording reproduction system, the volume V of a magnetic bit is decreased as a matter of course. In this regard, assuming that two systems adopt materials having the same magnetic anisotropic energy Ku, the magnetic energy Ku·V of the magnetic bit in one of the systems having a smaller volume is small as compared to the other system. In other words, as the recording density of the magnetic recording reproduction system increases, the magnetic energy of the magnetic bit decreases. This induces the problem of super-paramagnetism which is a phenomenon in which the magnetization of the magnetic bit is reversed due to the heat energy at around room temperatures. When the magnetization of the magnetic bit is reversed, the magnetic information of the magnetic bit varies even at room temperatures, with the result that the magnetic recording reproduction system cannot retain the recorded information.

To avoid this super-paramagnetism which is associated with magnetic bits with small volume, it is preferable to use a material with high magnetic anisotropic energy Ku. Using a material with high magnetic anisotropic energy Ku, the magnetic energy Ku·V is large even when the volume of the magnetic bit is small, and hence the problem of super-paramagnetism is avoided. However, this scheme is disadvantageous in a different way in that a material with high magnetic anisotropic energy Ku requires a stronger magnetic field (coersivity) for the recording, i.e. for the magnetization reversal of the magnetic bit.

A technology devised for solving this problem is an optically-assisted magnetic recording technology. The optically-assisted magnetic recording technology is arranged as follows: For magnetic recording by magnetic bits, a magnetic bit is heated by condensed light so that the coersivity of the recording medium is lowered. In this state, recording is carried out by applying a magnetic field to the magnetic bit. As the temperature is lowered after the magnetization reversal, the coersivity of the recording medium is increased. In this way, it is possible to prevent the super-paramagnetism in which the magnetization of the magnetic bit is reversed by the heat energy at around room temperatures.

This optically-assisted magnetic recording technology, however, also has a problem. As the recording density of the magnetic recording reproduction system increases, the size of a magnetic bit whose magnetization is to be reversed is decreased and hence the radius of the magnetic bit heated by light must be shortened. In this regard, light has diffraction limit and hence the size of a beam spot cannot be smaller than its wavelength. For this reason the magnetic bit to be heated occupies an area larger than the wavelength of light. In this way, the wavelength of light imposes limitations on the possibility of the increase in the recording density of the magnetic recording reproduction system.

This problem associated with the optically-assisted magnetic recording may be solved by the use of near-field light. The near-field light is light generated around an object smaller than the wavelength of light or around an opening smaller than the wavelength of light, when the light is applied thereto, and this near-field light is localized within a range smaller than the wavelength of the light. Adopting this near-field light as a light source for heating the recording medium, it is possible to heat a magnetic bit in an area smaller than the wavelength of light and to realize the increase in the recording density.

To heat a magnetic bit in an area smaller than the wavelength of light by near-field light and to carry out recording by precisely applying a magnetic field to the magnetic bit, the point of generation of the near-field light is preferably as close as possible to the point of generation of the magnetic field.

Examples of a method for generating near-field light in an area smaller than the diffraction limit of light include a method in which a narrowed portion shorter in size than the wavelength of light is formed by a conductive film made of metal or the like and light is applied to the narrowed portion and a method in which light is applied to a metal scatterer smaller than the wavelength of light. In any of these methods, light with higher intensity than the incident light is generated in an area smaller than the wavelength of the light, by means of surface plasmon and local plasmon. When the aforesaid narrowed portion is used, an intense magnetic field is generated around the narrowed portion by directly supplying a current to the conductive film. When the aforesaid metal scatterer is used, a micro coil is formed by the conductive film to surround the scatterer and a current is supplied to the coil, with the result that a magnetic field is generated in the vicinity of the point of generation of the near-field light.

The light applied to the near-field light generating device is typically applied from a light emitting device outside the near-field light generating device. To efficiently generate near-field light from the near-field light generating device, it is necessary to align the light emitting device with the near-field light generating device with nanometer accuracy, which is equal to or shorter than the wavelength of the light. Taking this alignment into consideration, the light emitting device, the near-field light generating device, and the magnetic field generator are preferably formed integrally by means of semiconductor process or the like.

In a conventional optically-assisted magnetic recording device (disclosed in K. Hongo, T. Watanabe "Lensless Surface Plasmon Head with 1 Tbit/in.2 Recording Density" in Japanese Journal of Applied Physics Vol. 47, No. 7, 2008, pp. 6000-6006) in which a light emitting device, a near-field light generating device, and a magnetic field generator are integrally formed, the light emitting device is a semiconductor laser device, and the light emitted from the semiconductor laser device is directly applied to the near-field light generating device. A technology similar to this is also disclosed in the specification of U.S. Pat. No. 7,547,868.

Now, a method of generating near-field light will be discussed.

FIG. 19 and FIG. 20 are respectively a perspective view and a plan view of the optically-assisted magnetic recording device disclosed in Hongo et al. and Japanese Unexamined Patent Publication No. 2008-90939. As shown in FIG. 19, on a substrate 901 which is made of an optically transmissive material, a stick-shaped scatterer 902 made of a conductive metal is formed. Surface plasmon is excited in such a way that the longitudinal direction of the scatterer 902 is aligned with the polarization direction of the light and the longitudinal length of the scatterer 902 is suitably arranged in accordance with the condition of the excitement of surface plasmon.

To the scatterer 902 suitably disposed and arranged as above, light is applied on the lower face of the substrate 901. As a result, as shown in FIG. 19, on a light receiving surface 903 to which the incident light of the scatterer 902 is applied and on a light emitting surface 904 which is opposite to the surface 903, surface plasmon is generated on account of the localization of electric charges caused by an electric field of the incident light.

When the resonance wavelength of the surface plasmon matches the wavelength of the incident light, the light and the surface plasmon are coupled and surface plasmon occurs, and hence the scatterer 902 becomes an electric dipole which is strongly polarized in the polarization direction. In the state of electric dipole, large electromagnetic fields are generated in the vicinity of the both ends of the large scatterer 902 in the longitudinal direction, with the result that strong near-field light is generated. Although the distribution and intensity of the generated near-field light strongly depend on the structure of the scatterer 902, the near-field light on the surface intersecting the polarization direction of the incident light is typically more intense in a portion with a high curvature than in its surrounding areas, because of the concentration of the electric field in that portion.

For example, when a stick-shaped scatterer 902 of FIG. 20 receives light whose polarization direction (direction of electric field vector) is in parallel to the longitudinal direction (E1) of the scatterer 902, the concentration of electric field occurs at the apexes of the end portions 905 and 906 where the curvature radius is large, and hence intense near-field light is generated at these points. When the light whose polarization direction is in the direction (E2) orthogonal to the longitudinal direction of the scatterer 902 is applied to the scatterer 902, near-field light is generated at the edge portions 907 and 908 extending in the longitudinal direction of FIG. 20.

In Hongo et al. and Japanese Unexamined Patent Publication No. 2008-90939, the aforesaid scatterer 902 is used for generating near-field light and a magnetic field generator 909 is provided for generating a magnetic field. The magnetic field generator 909 is a micro coil provided to surround the scatterer 902. As an electric current is supplied to the micro coil, a magnetic field is generated in the vicinity of the scatterer 902.

As discussed above, it is possible to generate intense near-field light by means of surface plasmon resonance by using a metal conductive film. As noted above, the surface plasmon generated on the conductive film is extremely sensitive to the polarization direction of incident light and the irregularities (curvature radius) on the conductive film edge. For this reason, in case where unintended irregularities exist on the near-field light generating device and/or the applied light is polarized in an unintended direction, the electric field amplification by surface plasmon may occur in an unintended portion, and intense near-field light may be generated in that portion.

For example, as shown in FIG. 21A, when there are irregularities at the edges 907 and 908 of the scatterer 902, intense near-field light (denoted by A and B in FIG. 21B) is generated at the apex portions 905 and 906 in response to the light which is applied to the scatterer 902 and which includes a polarized light component in the direction of the arrow Ea in FIG. 21B. However, when light including a polarized light component in the direction of the arrow Eb in FIG. 21C is applied, intense near-field light is generated at the irregularities (denoted by C and D in FIG. 21C) on the edges 907 and 908. Near-field light is generated in unintended portions in this way.

The scatterer 902 is manufactured by a semiconductor process such as lithography. In the mass production, microfablication is typically done by photolithography, and the microfablication by photolithography involves irregularities of about from several nanometers to several tens of nanometers.

The optically-assisted magnetic recording technology of Hongo et al. adopts a semiconductor laser device as the source of light. The light emitted from the semiconductor laser device is directly applied to the scatterer. A typical semiconductor laser device is generally designed so that light which is polarized only either in the in-plane direction of the active layer of the semiconductor laser device or in the direction perpendicular to that in-plane direction is stably output by lasing. The polarization direction of the induced emission is typically controlled by controlling the crystal strain of the well layer of the quantum well structure formed in the active layer of the semiconductor laser device.

SUMMARY OF THE INVENTION

However, the light emitted from the semiconductor laser device has not only a light generated by the aforesaid lasing but also a light generated by spontaneous emission. Light generated by spontaneous emission typically includes a light polarized in a different direction from the polarization direction of light generated by lasing.

Light generated by lasing is typically more intense than light of spontaneous emission, and the polarization ratio tends to increase as the drive current of the semiconductor laser device increases. However, when the drive current is low, the polarization ratio is small. In some cases the semiconductor laser device is able to drive with the polarization ratio of 10:1 or lower.

In case where near-field light is generated by surface plasmon, the electric field intensity of the generated near-field light may be enhanced up to several hundred times higher than the intensity of the incident light, when the conductive film has a specific shape. For this reason, when a light with an unintended polarization direction is irradiated to the near-field light generating device, near-field light may be generated at an unintended portion, and this may result in erroneous recording by the optically-assisted magnetic recording device having the aforesaid near-field light generating device.

An object of the present invention is to provide a highly reliable and highly stable near-field light generating device and an optically-assisted magnetic recording device including the near-field light generating device.

The near-field light generating device of the present invention includes: a substrate; a semiconductor laser device which is formed on the substrate and emits the laser light polarized in a first direction; a light absorbing device which is formed on the substrate to be close to a light emission part of the semiconductor laser device and absorbs light polarized in a second direction orthogonal to the first direction; and a near-field light generator which is formed on the substrate to be close to a light emission part of the light absorbing device.

According to this arrangement, light emitted from the semiconductor laser device is irradiated to the near-field light generator via the light absorbing device. The light irradiated to the near-field light generating device is polarized almost only in the first direction. It is therefore possible to restrain the generation of unnecessary near-field light due to light polarized in the second direction. This improves the reliability and stability of the near-field light generating device.

The optically-assisted magnetic recording device of the present invention includes the aforesaid near-field light generating device and a magnetic field generator which is formed nearby the near-field light generator in the near-field light generating device. According to this arrangement, erroneous recording due to unnecessary near-field light is restrained and an unstable operation of the semiconductor laser device caused by the heat from the magnetic field generator is also restrained, with the result that a highly reliable optically-assisted magnetic recording device with long life is easily obtained.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

First Embodiment

Figure 1:
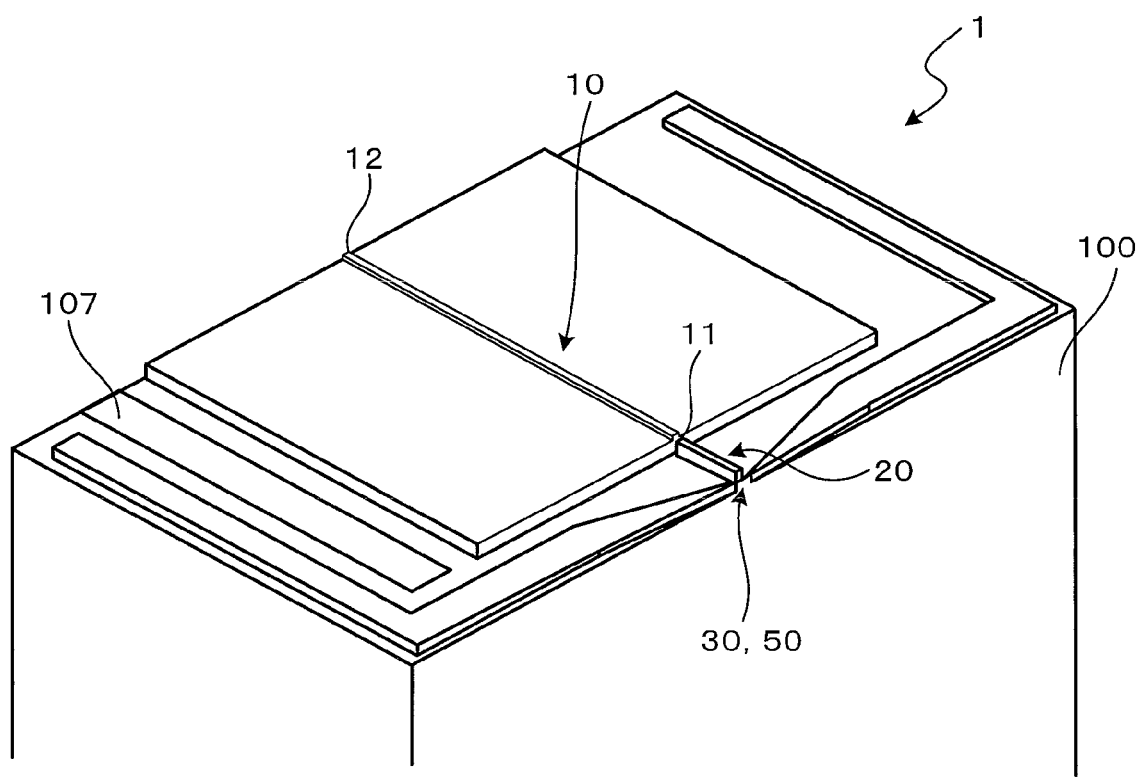
FIG. 1 is a perspective view of an optically-assisted magnetic recording device of First Embodiment of the present invention.

First, referring to FIG. 1 to FIG. 7, an optically-assisted magnetic recording device 1 of First Embodiment will be described. The optically-assisted magnetic recording device 1 includes a substrate 100, a semiconductor laser device 10, a near-field light generating device which includes an optical absorption waveguide 20 and a near-field light generator 30 and is formed on the same plane of the substrate 100 as the semiconductor laser device 10, and a magnetic field generator 50.

<Overall Structure>

Figure 2:
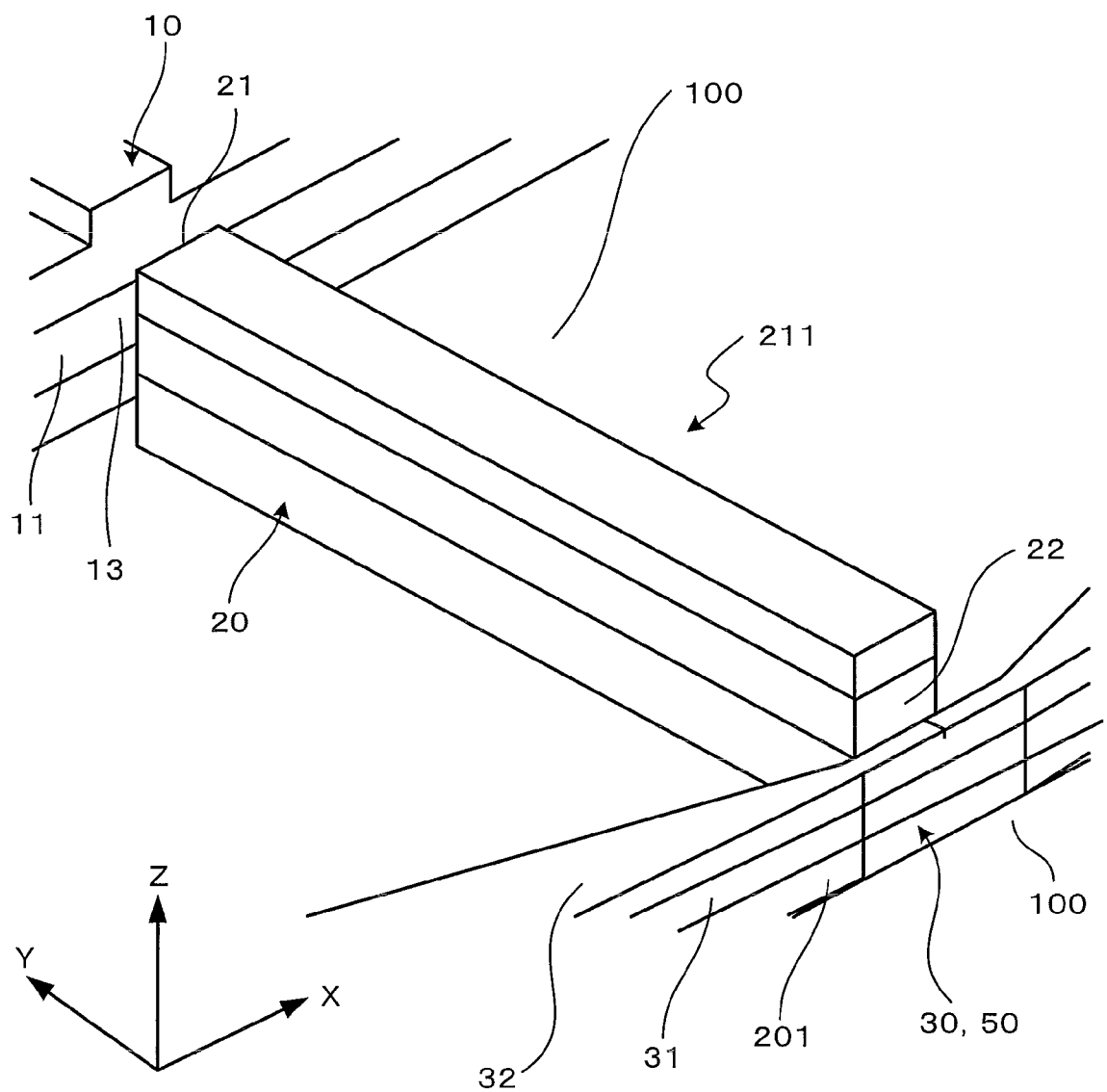
FIG. 2 is a partial enlarged perspective view of the optically-assisted magnetic recording device of FIG. 1.

As shown in FIGS. 1 and 2, the optically-assisted magnetic recording device 1 has the gallium arsenide (GaAs) substrate 100. On the substrate 100 provided is the semiconductor laser device 10. This semiconductor laser device 10 has a cavity structure. At the both ends of the cavity structure provided are facet mirrors 11 and 12 which reflect light. In the direction of light emission from one facet mirror 11 and around the facet mirror 11, a light incident part 21 of the optical absorption waveguide 20 is disposed to oppose the facet mirror 11. On the opposite side of the optical absorption waveguide 20 from the light incident part 21 formed is a light emission part 22. In the direction of light emission from the light emission part 22 and around the light emission part 22 provided are the near-field light generator 30 and the magnetic field generator 50.

<Semiconductor Laser Device>

Figure 3:
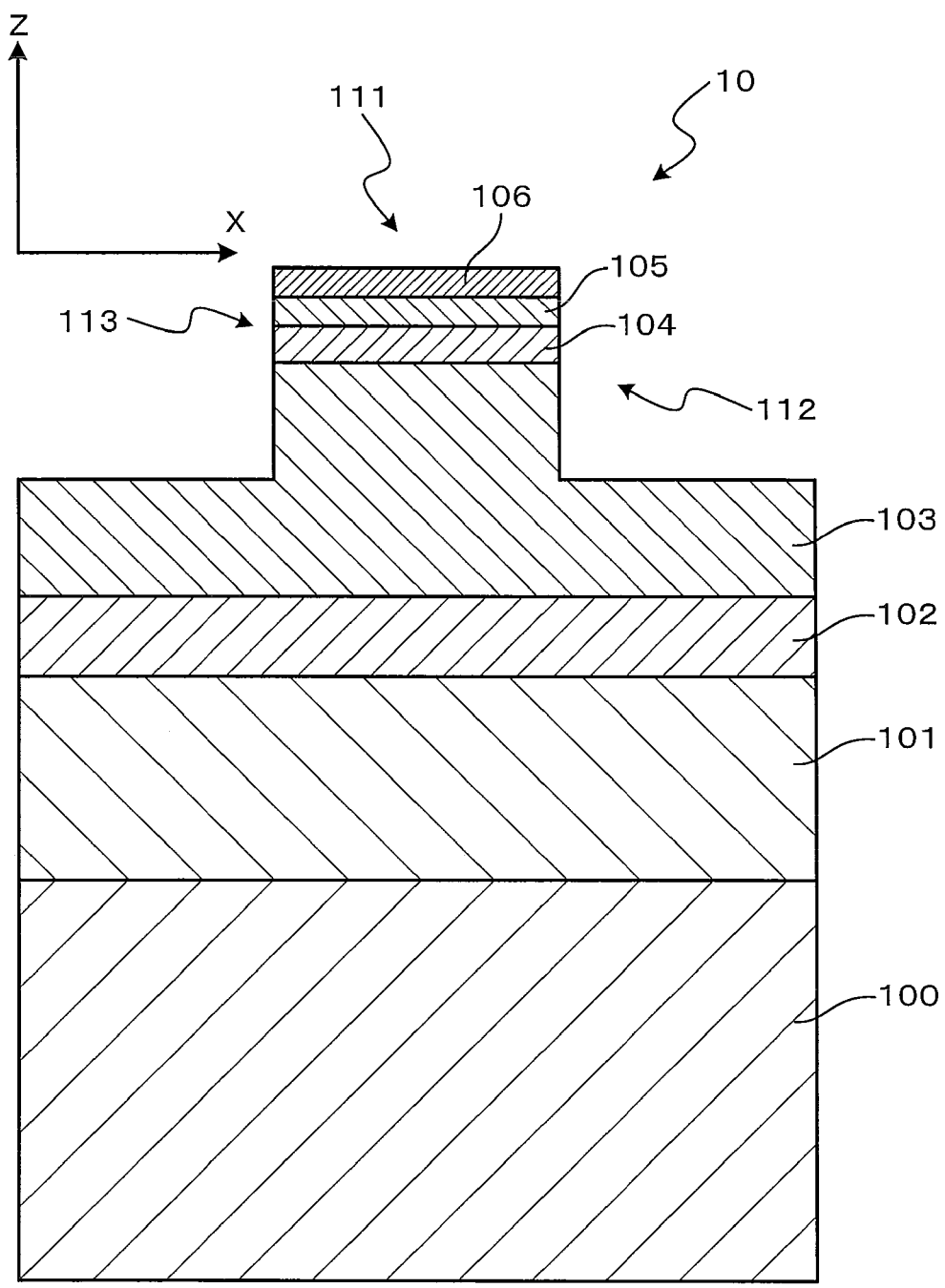
FIG. 3 is a cross section of a semiconductor laser device in the optically-assisted magnetic recording device of FIG. 1.

Referring to FIG. 3, the structure of the semiconductor laser device 10 is now discussed. On the n-GaAs substrate 100, the following layers are deposited in this order: an n-$(Al_xGa_{1-x})_{1-y}In_yP$ (x=0.7, y=0.49) n-cladding layer 101, a quantum well active layer 102 which consists of $In_xGa_{1-x}P$ (x=0.45) well layer/$(Al_xGa_{1-x})_{1-y}In_yP$ (x=0.5, y=0.49) barrier layer, a p-$(Al_xGa_{1-x})_{1-y}In_yP$ (x=0.7, y=0.49) p-cladding layer 103, a p-$In_xGa_{1-x}P$ (x=0.49) p-buffer layer 104, and a p-GaAs contact layer 105. The n-cladding layer 101 and the p-cladding layer 103 are both 1.2 μm thick. The number of well layers in the active layer 102 is at least one, preferably three. The barrier layers and the well layers are alternately deposited, and the both edges of the active layer 102 are barrier layers. Each of the well layers and the barrier layers are 7 nm thick, and the p-GaAs contact layer 105 is 20 nm thick. The aforesaid thickness, number of well layers, and materials are mere examples. The materials and the thickness may be suitably determined in accordance with desired properties (emission wavelength, polarization direction, emission power, threshold, or the like).

For example, the substrate 100 may be a substrate typically used in a semiconductor laser device. Examples of the material of the substrate include GaAs, GaAsP, GaP, InP, GaN, ZnO, $Ga_2O_3$, Si, and $Al_2O_3$. The active layer 102 may be a semiconductor thin film made of AlGaInP, InGaP, InP, GaAs, AlGaAs, InGaAs, AlGaInAs, GaN, InGaN, InN, AlInGaN, AlGaN, ZnO, ZnMgO, ZnCdO, ZnSe, ZnSSe, InGaNAs, or the like.

The above-described layers are formed by metalorganic vapor phase epitaxy (MOVPE), molecular beam epitaxy (MBE), or the like, which are typically adopted for manufacturing a crystal thin film for a semiconductor laser device.

The semiconductor laser device 10 has a non-buried ridge-type waveguide structure. From the surface of the semiconductor laser device 10 to the p-cladding layer 103, grooves 112 and 113 are formed to shape a ridge 111 defining a cavity.

The grooves 112 and 113 do not reach the surface of the quantum well active layer 102. Therefore another semiconductor layer (p-cladding layer 103) remains in the space between the bottom surfaces of the grooves 112 and 113 and the surface of the quantum well active layer 102. Such a structure in which grooves are formed in a semiconductor layer deposited on an active layer is termed a non-buried ridge-type structure.

On the contact layer 105 provided is a p-electrode 106. On the n-GaAs substrate 100, an n-electrode 107 is deposited by vapor deposition or the like.

Figure 4:
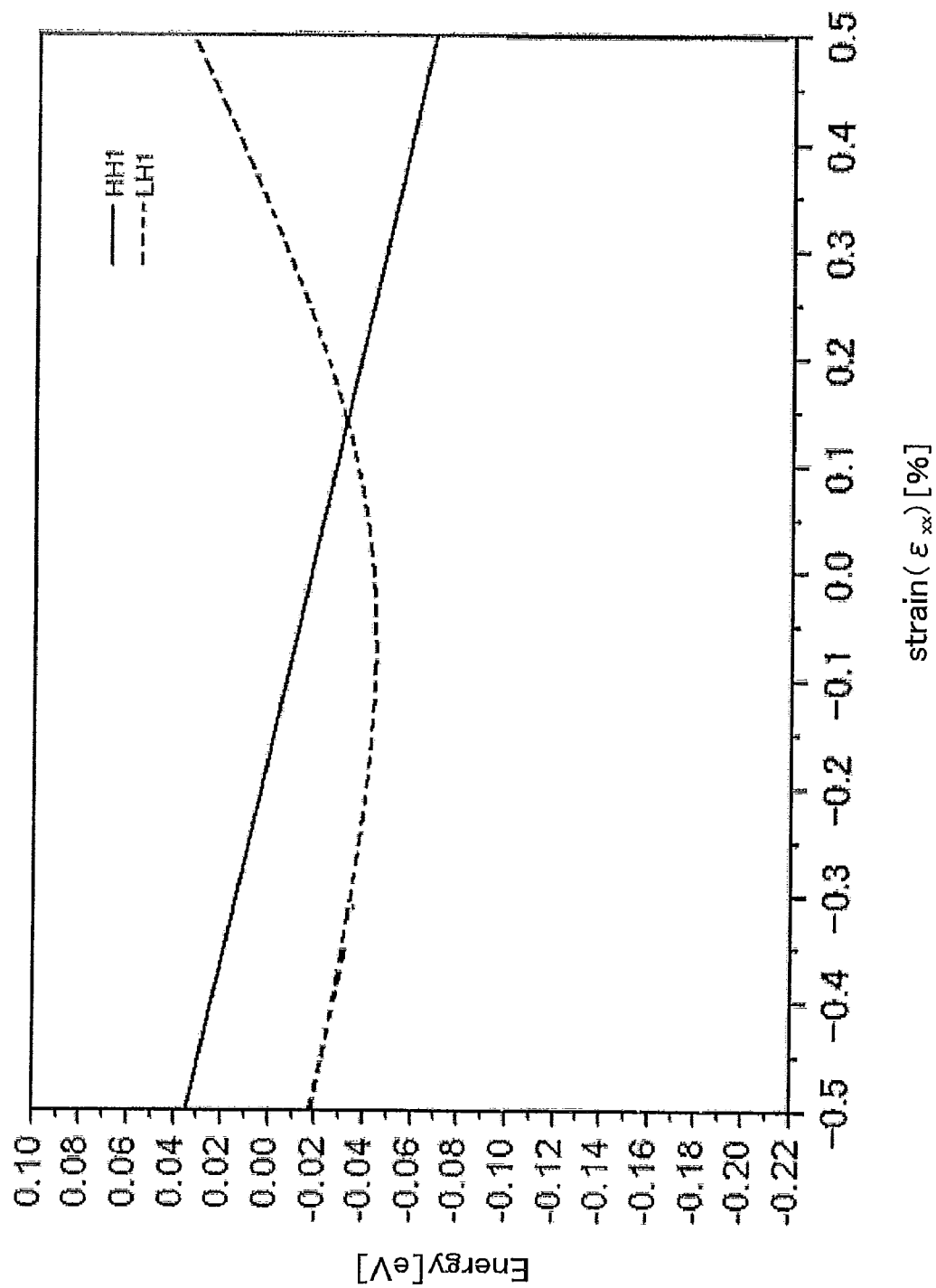
FIG. 4 is a graph showing the well layer strain dependency of the valence band energy of the quantum well in the semiconductor laser device of the optically-assisted magnetic recording device shown in FIG. 1.

Now, a typical band structure of a quantum well will be explained. FIG. 4 shows an example of numerical calculations of the $In_xGa_{1-x}P$ well layer strain dependency of the quantum level in a quantum well constituted by an $In_xGa_{1-x}P$ well layer and an $(Al_yGa_{1-y})_{1-z}In_zP$ (y=0.50, z=0.49) barrier layer, on condition that the width of the $In_xGa_{1-x}P$ well layer is 5.5 nm and the width of the $(Al_yGa_{1-y})_{1-z}In_zP$ (y=0.50,z=0.49) barrier layer is 7.0 nm. Since the layers 101 to 105 of the aforesaid semiconductor laser device 10 are grown on GaAs substrate 100 epitaxially, each layer is lattice-matched to the GaAs substrate 100. For this reason, the lattice constant of each layer in a direction perpendicular to the confinement direction of the quantum well is in consistent with the bulk value of the lattice constant of GaAs. The strain $\in$ of the $In_xGa_{1-x}P$ well layer is therefore calculated by the equation (1) from the lattice constant (aGaAs) of the GaAs substrate and the lattice constant ($aIn_xGa_{1-x}P$) of the strain-free $In_xGa_{1-x}P$.

$$\in = (aGaAs - aIn_xGa_{1-x}P)/aIn_xGa_{1-x}P \quad (1)$$

The lattice constant ($aIn_xGa_{1-x}P$) of the strain-free $In_xGa_{1-x}P$ is, in accordance with Vegard's law, calculated by the equation (2) from the lattice constant (aInP) of the strain-free InP and the lattice constant (aGaP) of the strain-free GaP, and is varied by the In composition x of the $In_xGa_{1-x}P$ well layer.

$$aIn_xGa_{1-x}P = x \times aInP + (1-x) \times aGaP \quad (2)$$

As shown in the equation (1), when aGaAs<aInGaP, the strain $\in$ is positive. On the other hand, when aGaAs>aInGaP, the strain $\in$ is negative.

The valence band quantum level is calculated by diagonalizing the valence band Hamiltonian in consideration of the strain. Such a calculation method is typically used for calculating a semiconductor valence band quantum level, as detailed in J. Piprek "Semiconductor Optoelectronic Devices", Academic Press, (2003), for example.

In FIG. 4, HH1 denotes the first (ground) quantum level of the heavy hole band, whereas LH1 denotes the first (ground) quantum level of the light hole band. As shown in FIG. 4, both of the HH1 and LH1 vary in accordance with the strain $\in$ of the $In_xGa_{1-x}P$ well layer.

When the strain $\in$ is substantially equal to 0 or when $\in<0$, HH1 is the valence band quantum level with the highest energy, i.e. is the first quantum level of the valence band. In case of the light emitting device, the transition between the ground (first quantum) level (CB1) of the conduction band and HH1, i.e. the transition between CB1 and HH1 is dominant. In the transition between CB1 and HH1, light (TE-polarized light) polarized in a direction perpendicular to the confinement direction of the quantum well is emitted, considering with the selection rule. For this reason, the material gain for TE-polarized light by current injection is mainly generated, and TE-polarized light is absorbed.

When $\in=0.13\%$, HH1 is substantially equal to LH1. When $\in>0.13$, the level of LH1 is the first quantum level of the valence band, and hence the transition between CB1 and LH1 is dominant. In the transition between CB1 and LH1, emitted are both the light (TM-polarized light) polarized in the confinement direction of the quantum well and the TE-polarized light. Comparing these types of light, the TM-polarized light is more intense than the TE-polarized light. For example, the direction of the crystal growth in the well layer is a <100> direction, the TM-polarized light is four times more intense than the TE-polarized light. Therefore the material gain generated by current injection is maximized in the TM-polarized light. Regarding the light absorption, the TM-polarized light is absorbed more than the TE-polarized light.

The calculation result shown in FIG. 4 is a mere example. The HH1 quantum level, the LH1 quantum level, and the strain of the well layer where HH1 intersects LH1 are varied in accordance with the width of the well layer, the width of the barrier layer, the material of the well layer, the material of the barrier layer, the material of the substrate, or the like. It is, however, noted that a calculation result similar to the above is also obtained when the quantum well active layer of the semiconductor laser device is made of a typical material such as AlGaInP, InGaP, InP, GaAs, AlGaAs, InGaAs, and AlGaInAs. When the strain $\in$ of the well layer of the quantum well active layer is 0 or lower than 0, HH1 is the highest energy level of the valence band, and the energy levels of HH1 and LH1 are substantially the same when the strain $\in$ has a certain positive value. When the strain c is higher than the above, LH1 tends to be the highest energy of the valence band. The value of the strain $\in$ with which the HH1 and the LH1 have the substantially same energy levels is in the range of 0.03 to 0.20%.

The degree of the strain above, 0.03 to 0.20%, is small enough to fall within the margin of error in the crystal growth by the aforesaid metalorganic vapor phase epitaxy (MOVPE), molecular beam epitaxy (MBE), or the like. Such a small degree of strain can therefore be regarded as substantially strain-free. Taking into consideration of this, the present embodiment assumes that a strain which is higher than the strain $\in$ with which the HH1 and the LH1 have the same value is tensile strain, whereas a strain which is lower than the strain $\in$ with which the HH1 and the LH1 have the same value is strain-free or compressive strain.

In the active layer 102 of the semiconductor laser device 10 of the present embodiment, the well layer has a tensile strain ($\in$ to 0.4%) in a direction perpendicular to the confinement direction of the quantum well. Therefore the gain during the lasing is higher in the TM-polarized light than in the TE-polarized light, and hence the semiconductor laser device 10 emits the TM-polarized light. The wavelength is about 630 nm.

The cavity of the semiconductor laser device 10 has the facet mirrors 11 and 12. The flat surfaces of the mirrors 11 and 12 are preferably formed by etching. Alternatively, the flat surfaces may be formed by a method such as cleavage. On the surfaces of the mirrors 11 and 12, for example a dielectric multi-layer film and a metal film may be formed to adjust the reflectance. In the present embodiment, the semiconductor laser device 10 emits laser light from an emission facet 13 facing the optical absorption waveguide 20.

On the n-GaAs substrate 100 and the p-GaAs contact layer 105, an n-electrode 107 and a p-electrode 106 are formed, respectively. A positive voltage is applied on the p-electrode 106 with an external power source (not illustrated). 0V is applied to the n-electrode. When a current higher than the lasing threshold is injected, the semiconductor laser device 10 emits the laser light from the emission facet 13 into outside.

The light emitted from the emission facet 13 has a divergence angle, because of the diffraction caused by the waveguide structure in the semiconductor laser device 10. The divergence angle varies depending on the layer structure of the semiconductor laser device 10 and the shape of the ridge 111. In FIG. 2, for example, the divergence angle is about 10 degrees in the x direction and about 30 degrees in the z direction. The light emitted from the emission facet 13 includes a TE-polarized light component generated by spontaneous emission, in addition to the TM-polarized light generated by the lasing.

<Optical Absorption Waveguide>

Figure 5:
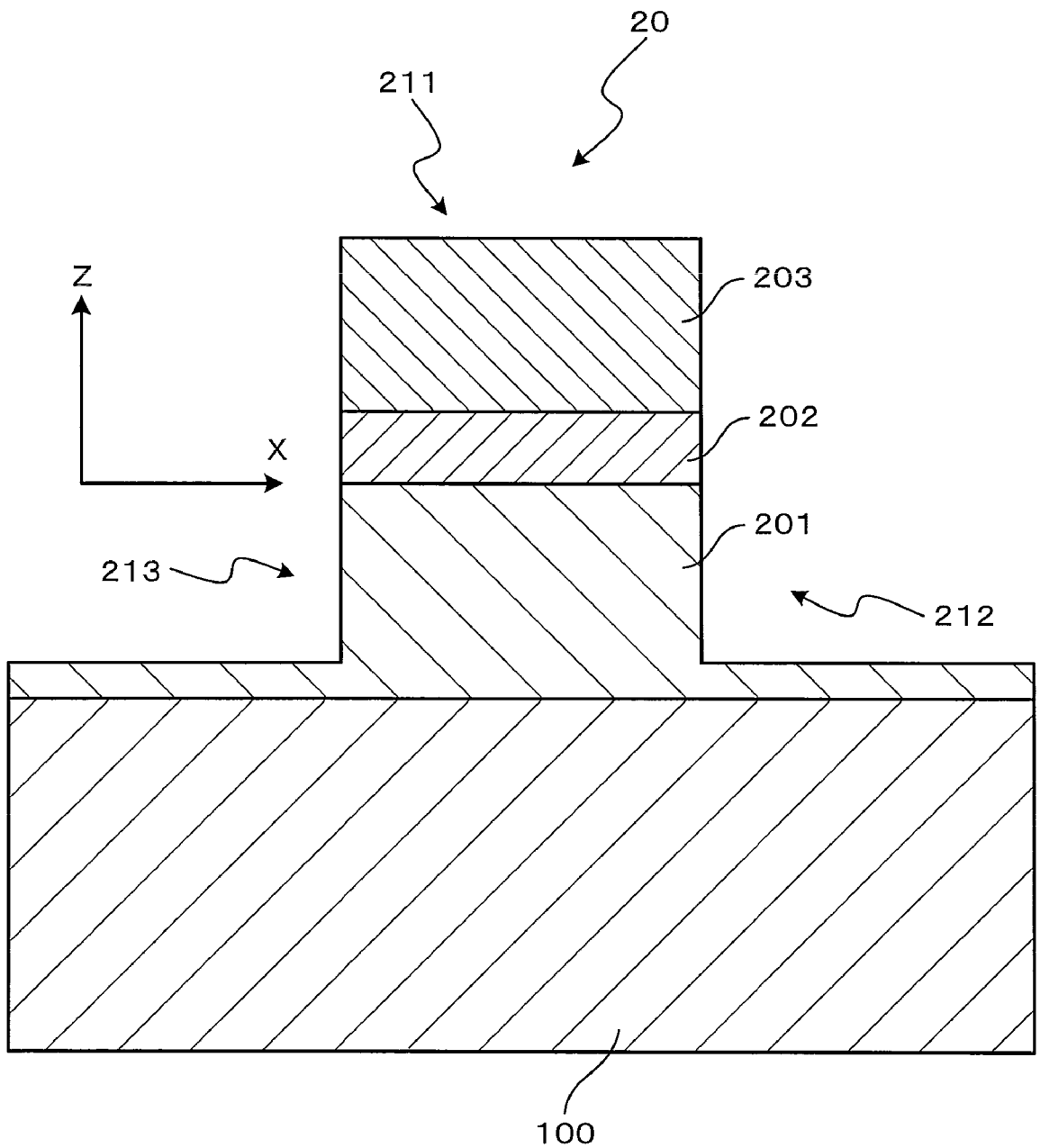
FIG. 5 is a cross section of an optical absorption waveguide in the optically-assisted magnetic recording device of FIG. 1.

Referring to FIG. 5, the structure of the optical absorption waveguide 20 will be discussed. The optical absorption waveguide 20 is formed by depositing the following layers on the n-GaAs substrate 100 in this order: a lower $(Al_xGa_{1-x})_{1-y}In_yP$ (x=0.7,y=0.49) cladding layer 201, a quantum well absorption layer 202 consists of $In_xGa_{1-x}P$ (x=0.52) well layer/$(Al_xGa_{1-x})_{1-y}In_yP$ (x=0.5,y=0.49) barrier layer, and an upper $(Al_xGa_{1-x})_{1-y}In_yP$ (x=0.7,y=0.49) cladding layer 203. The cladding layer 201 and the cladding layer 203 are both 1.15 μm thick. The absorption layer 202 is constituted by at least one quantum well, and each well layer is 3.5 nm thick. Each barrier layer is 7 nm thick. The number of well layers is preferably 10 or more. The thickness of each of the cladding layers 201 and 203 is arranged so that the center of the absorption layer 202 is substantially as high as the active layer 102 of the semiconductor laser device 10.

As the materials of the layers are mere examples, it is possible to use other materials. The optical absorption waveguide 20 has a striped structure as shown in FIGS. 2 and 5, and grooves 212 and 213 are formed to shape the ridge 211 ranging from the surface of the optical absorption waveguide 20 to the cladding layer 201. The width of the ridge 211 is substantially identical with the width of the ridge 111 of the semiconductor laser device 10.

The optical absorption waveguide 20 is formed by the aforesaid metalorganic vapor phase epitaxy (MOCVD) or molecular beam epitaxy (MBE), on the n-GaAs substrate 100 along with the semiconductor laser device 10. First, on the n-GaAs substrate 100, the layers of the semiconductor laser device 10 are deposited. Then the layers of the semiconductor laser device 10 are etched away at the portion where the optical absorption waveguide 20 is to be formed. As a result the n-GaAs substrate 100 is exposed again, and the layers of the optical absorption waveguide 20 are deposited. Thereafter, the layers of the optical absorption waveguide 20, which have been deposited above the layers of the semiconductor laser device 10, are etched away, so that the p-electrode 106 and the n-electrode 107 of the semiconductor laser device 10 are formed (two-stage growth). This method adopting the two-stage growth, however, is a mere example. Another method may be used as long as the semiconductor laser device 10 and the optical absorption waveguide 20 are formed on the same substrate.

The quantum well absorption layer 202 is arranged so that the well layer is either strain-free or has a compression strain in a direction perpendicular to the confinement direction of the quantum well. For this reason, in the valence band of the quantum well absorption layer 202, the energy of the HH1 is the highest, and the TE-polarized light is mainly absorbed by the excitation between CB1 and HH1, when the optical absorption waveguide 20 receives light having higher energy than the energy gap between CB1 and HH1. When the optical absorption waveguide 20 receives light having higher energy than the energy gap between CB1 and LH1, the TM-polarized light is mainly absorbed due to the excitation between CB1 and LH1.

In the present embodiment, the energy level of the LH1 of the quantum well absorption layer 202 is lower than that of the HH1. Therefore the energy between CB1 and LH1 (which is in this case the second quantum level of the valence band) is larger than the energy between CB1 and HH1 (which is in this case the first quantum level of the valence band). On this account, the optical absorption waveguide 20 absorbs only the TE-polarized light when the light has the wavelength equivalent to energy larger than that of CB1-HH1 and smaller than that of CB1-LH1.

Figure 6:
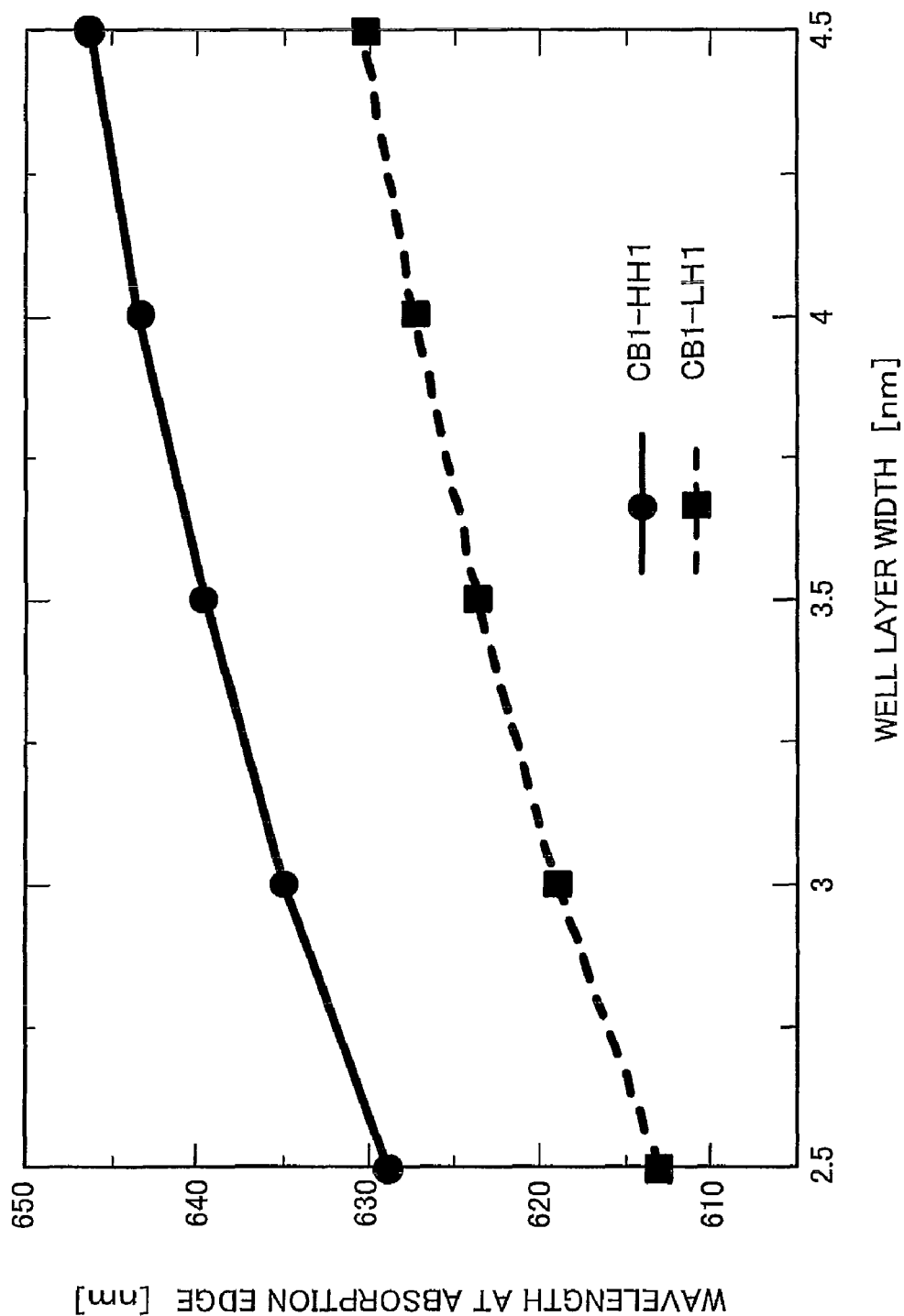
FIG. 6 is a graph showing the well width dependency of the absorption edge of the optical absorption waveguide in the optically-assisted magnetic recording device of FIG. 1.

FIG. 6 shows a result of numerical calculations of the well layer width dependency of the energies between CB1 and HH1 and between CB1 and LH1, in the $In_xGa_{1-x}P$ (x=0.55) well layer/$(Al_xGa_{1-x})_{1-y}In_yP$ (x=0.5,y=0.49) barrier layer quantum well. As shown in FIG. 6, the levels CB1-HH1 and CB1-LH1 vary in accordance with the width of the well layer. Since the well width of the optical absorption waveguide 20 is 3.5 nm, the energy equivalent to the light wavelength of 630 nm falls within the range between CB1-HH1 and CB1-LH1. Therefore, when the optical absorption waveguide 20 receives light having the wavelength of 630 nm, TE-polarized light is selectively absorbed strongly. Furthermore, as shown in FIG. 6, in case where the width of the well layer falls within the range between 2.5 nm and 4.5 nm, the energy equivalent to the light with 630 nm wavelength is between CB1-HH1 and CB1-LH1. It is therefore possible to allow the TE-polarized light to be selectively absorbed strongly.

The light incident part 21 of the optical absorption waveguide 20 is provided to oppose to the emission facet 13 of the semiconductor laser device 10. With this, the light emitted from the emission facet 13 of the semiconductor laser device 10 is introduced into the optical absorption waveguide 20 via the light incident part 21.

The optical absorption waveguide 20 has the light emission part 22 on the side opposite to the light incident part 21. The light incident to the optical absorption waveguide 20 from the light incident part 21 passes through the optical absorption waveguide 20 and is emitted from the light emission part 22. With this, even if laser light includes a TE-polarized light component, the light emission part of the optical absorption waveguide 20 emits only TM-polarized light.

The film structure and material of the optical absorption waveguide 20 are not limited to the above. Any arrangements different from the above may be adopted as long as only a TE-polarized light component is absorbed from the light emitted from the semiconductor laser device 10.

<Near-Field Light Generator>

Figure 7:
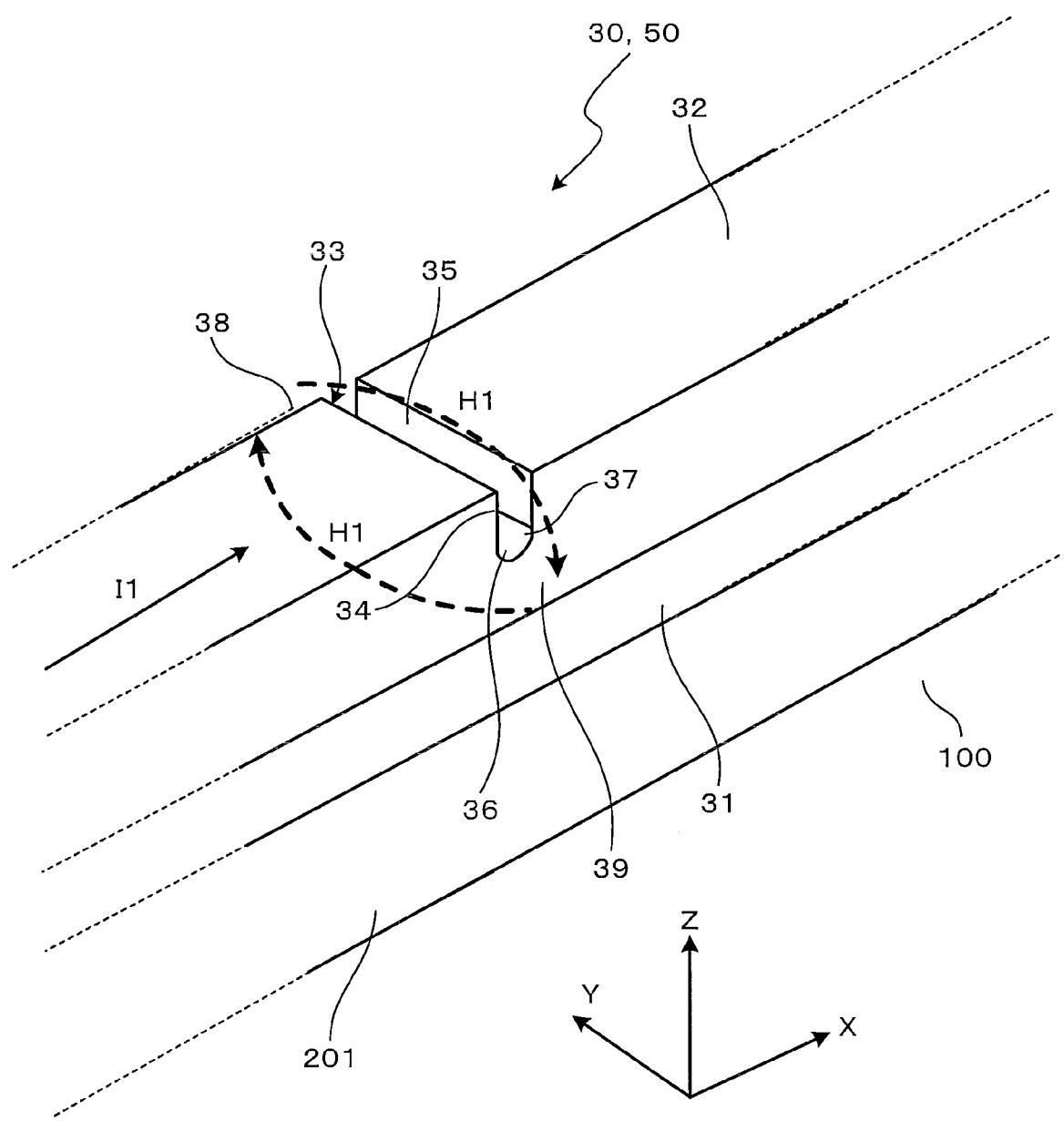
FIG. 7 is a perspective view of a near-field light generator and a magnetic field generator in the optically-assisted magnetic recording device of FIG. 1.

Referring to FIG. 2 and FIG. 7, the near-field light generator 30 is detailed. The near-field light generator 30 is provided in the vicinity of the optical absorption waveguide 20 in such a way as to oppose the light emission part 22 of the optical absorption waveguide 20.

The near-field light generator 30 is composed of an insulating layer 31 formed on the cladding layer 201 and a metal conductive layer 32. The conductive layer 32 has a groove 33 extending in the direction of light emission from the optical absorption waveguide 20. The groove 33 has two side faces 34 and 35 which oppose to each other in the direction perpendicular to the direction of light emission from the optical absorption waveguide 20. The conductive film 32 is 50 nm thick and the groove 33 is 30 nm deep. Therefore the bottom 36 of the groove 33 forms a narrowed portion 37 which does not reach the insulating layer 31 and functions as a sub-micro-opening required for the generation of near-field light. The bottom surface of the narrowed portion 37 is curved and bulges downward.

The insulating layer 31 is 50 nm thick, and preferably has thickness with which the narrowed portion 37 is substantially as high as the center of the absorption layer 202 of the optical absorption waveguide 20. The groove 33 is about 50 nm wide, and the curvature radius around the bottom surface of the narrowed portion 37 of the groove 33 is about 20 nm. The near-field light generator 30 has a light incident surface 38 which opposes to the optical absorption waveguide 20 and a near-field light generating surface 39 which is on the side opposite to the surface 38.

The laser light emitted from the semiconductor laser device 10 passes through the optical absorption waveguide 20 and is applied from the emission part 21 of the optical absorption waveguide 20 to the light incident surface 38. Since this applied light is TM-polarized light, surface plasmon is excited at the bottom surface of the groove 33, and near-field light is generated around a portion where the bottom surface of the groove 33 intersects the near-field light generating surface 39. Since the width of the narrowed portion 37 is narrower than the wavelength of the irradiation light, The transmitted light cannot pass through the narrowed portion 37, with the result that only near-field light exists on the near-field light generating surface 39.

In which portion near-field light is generated depends on the polarization direction of the irradiated light and the shape of the narrowed portion 37. In the near-field light generator 30 of the present embodiment, near-field light is generated only in the vicinity of the bottom surface of the groove 33. Around the near-field light generating surface 39, the portion where near-field light is generated (i.e. the range in which the light intensity is not lower than 1/e of the peak intensity) is a circle with the radius of about 20 nm centered around the bottom surface center of the groove 33, and is in a similar level to the curvature radius of the bottom surface.

The material and film thickness of the near-field light generator 30 and the shape of the narrowed portion 37 are determined in accordance with the wavelength, intensity, and spot size of near-field light to be generated. More specifically, they are calculated and designed by using an electromagnetic field simulation method such as finite-difference time-domain (FDTD) of Maxwell's equation.

<Magnetic Field Generator>

As a current is supplied in the direction from the facet 34 of the conductive layer 32 of the near-field light generator 30 to the facet 35 (i.e. the direction indicated by the arrow I1 in FIG. 7), a magnetic field is generated around the groove 33 in accordance with the right-handed screw rule, as the arrow H1 in FIG. 7 indicates. Since the cross section of current flow is narrower in the groove 33 than in the other portions of the conductive layer 32, the current density of the current flowing in the conductive layer of the groove 33 is higher than those in the remaining portions. A magnetic field is therefore maximized around the groove 33. When a current flows in the direction from the facet 35 to the facet 34, the direction of the magnetic field generated around the conductive layer 32 is opposite to the direction of the magnetic field denoted by H1 in FIG. 7. That is to say, in the present embodiment, an area around the groove 33 of the conductive layer 32 constitutes a magnetic field generator 50. In the present embodiment, the magnetic field generator 50 locates in the vicinity of the near-field light generator 30 because the magnetic field generator 50 and the near-field light generator 30 share a common component.

As discussed above, emitting laser light by semiconductor laser device 10 and the current supplying to the conductive layer 32 are carried out at the same time, with the result that near-field light and a magnetic field are simultaneously generated in the area smaller than the wavelength of laser light, and hence the optically-assisted magnetic recording device 1 is formed.

According to the present embodiment, the light emitted from the semiconductor laser device 10 reaches the near-field light generator 30 via the optical absorption waveguide 20. Since the light irradiating the near-field light generator 30 substantially includes only TM-polarized light, it is possible to suppress the generation of unnecessary near-field light on account of TE-polarized light and hence a highly reliable and stable near-field light generating device is realized.

Figure 19:
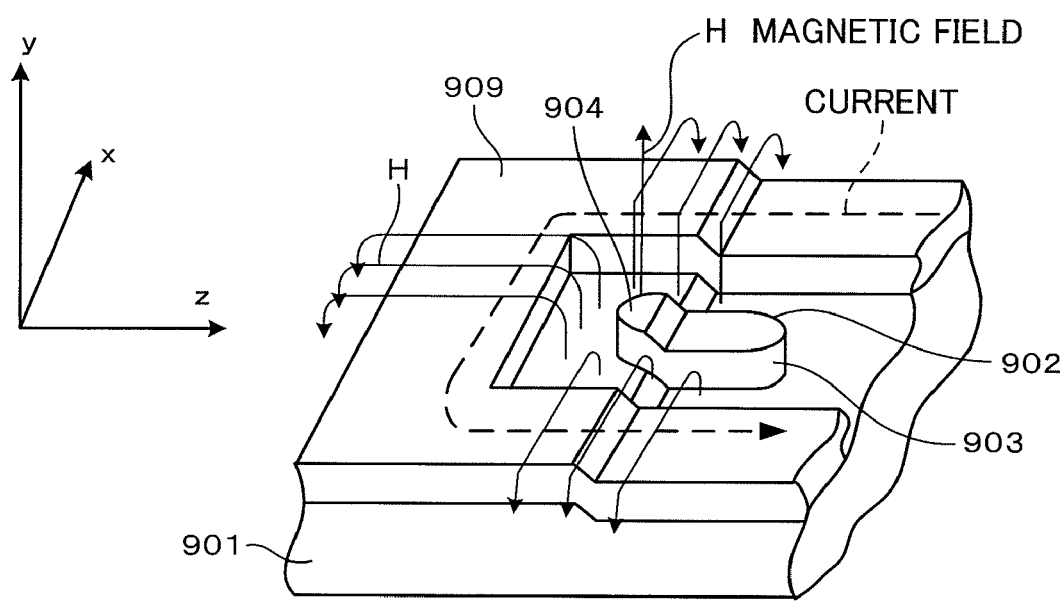
FIG. 19 is a perspective view of a near-field light generating device of Patent Document 1 and Non-Patent Document 1.
Figure 20:
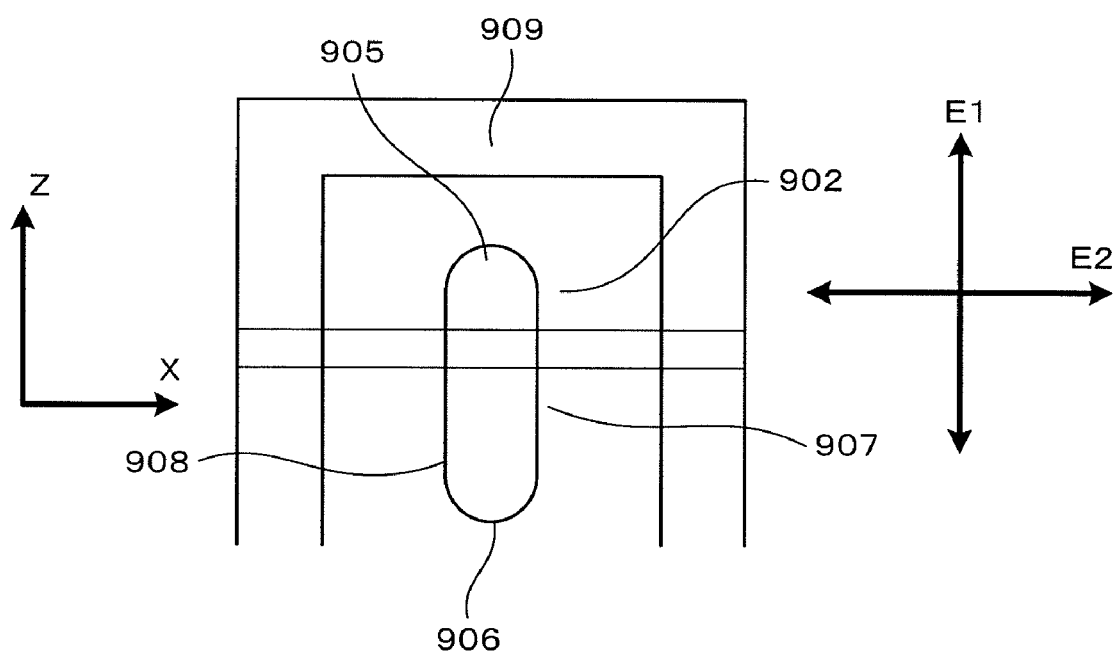
FIG. 20 is a plan view of the near-field light generating device of Patent Document 1 and a Non-Patent Document 1.
Figure 21A:
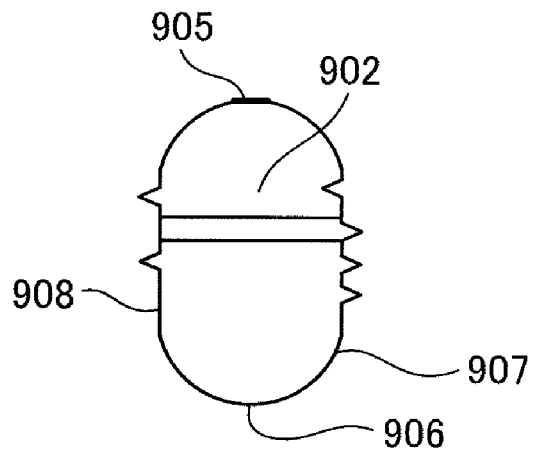
FIG. 21A, FIG. 21B, and FIG. 21C are plan views illustrating the polarization dependency of a near-field light generating device having irregularities.
Figure 21B:
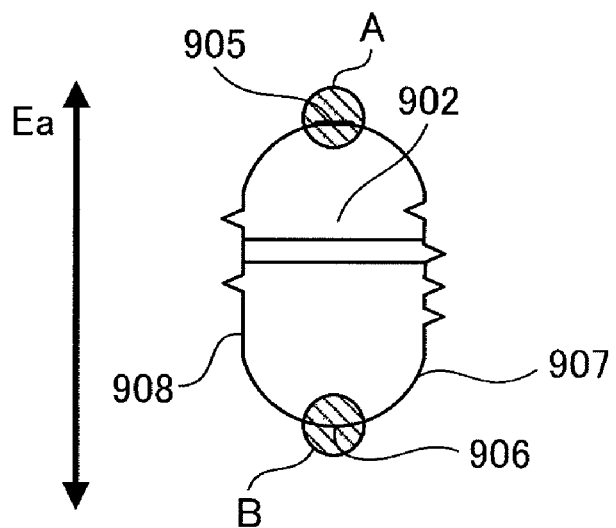
Figure 21C:
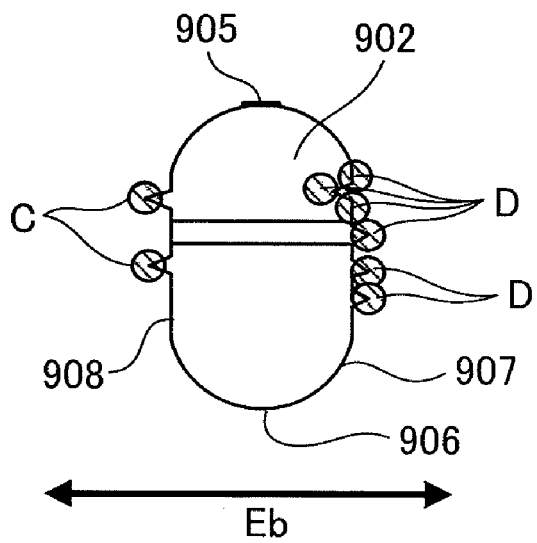

In the optically-assisted magnetic recording device of Non-Patent Document 1 described with reference to FIG. 19 and FIG. 20, light generated from the semiconductor laser device directly irradiates the scatterer 902. Therefore the intensity of generated near-field light decreases as the distance between the scatterer 902 and the semiconductor laser device increases. In this regard, to generate near-field light having enough intensity for the optically-assisted magnetic recording, it is necessary to arrange the semiconductor laser device to be close to the scatterer 902. In the meanwhile, since it is necessary to supply a current to the magnetic field generator 909 to generate a magnetic field, resistive heat is generated by the magnetic field generator 909. When the conductor is small in order to generate a magnetic field in a small area, the resistance of the magnetic field generator 909 is high. Moreover, it is necessary to supply a large current to the conductor to generate an intense magnetic field. Therefore, when an intense magnetic field is generated, the magnetic field generator 909 generates a large amount of heat. As the heat generated from the magnetic field generator 909 is transferred to the semiconductor laser device, the properties of the semiconductor laser device are influenced by the heat, with the result that the deterioration of the device and unstable operation such as a change in the drive current may occur.

On the other hand, the present embodiment is arranged so that the optical absorption waveguide 20 is formed between the semiconductor laser device 10 and the near-field light generator 30. This prevents the Joule's heating of the near-field light generator 30 from adversely influencing on the semiconductor laser device 10, and hence the life of the near-field light generating device is elongated. Furthermore, because of the presence of the optical absorption waveguide 20, the intensity of near-field light generated from the near-field light generator 30 barely depends on the distance between the semiconductor laser device 10 and the near-field light generator 30. This provides greater design freedom regarding that distance.

In addition, since the active layer 102 of the semiconductor laser device 10 has a quantum well structure, the direction dependency of the material gain of the semiconductor laser device 10 is easily controllable. Since this makes it easy to realize a laser device emitting light polarized in a single direction, it is possible to generate near-field light highly efficiently. Furthermore, since the absorption layer 202 of the optical absorption waveguide 20 has a quantum well structure, the polarization direction of the light absorbed by the absorption layer 202 of the optical absorption waveguide 20 is easily controllable and hence the near-field light can be generated highly efficiently.

The active layer 102 of the semiconductor laser device 10 has the quantum well structure in which the well layer has a tensile strain in a direction perpendicular to the confinement direction of the quantum well, whereas the absorption layer 202 of the optical absorption waveguide 20 has a quantum well structure in which the well layer is strain-free or has a compression strain in a direction perpendicular to the confinement direction of the quantum well. This allows the semiconductor laser device 10 to efficiently emit the TM-polarized laser light and allows the optical absorption waveguide 20 to absorb TE-polarized light.

In the present embodiment, the well layer in the absorption layer 202 of the optical absorption waveguide 20 is arranged so that an energy gap between the first quantum level of the valence band and the first quantum level of the conduction band is smaller than the energy of the light corresponding to the wavelength of the laser light and an energy gap between the second quantum level of the valence band and the first quantum level of the conduction band is larger than the energy of the light corresponding to the wavelength of the laser light. This allows the optical absorption waveguide 20 to strongly absorb only a TE-polarized light component from the light emitted from the semiconductor laser device 10. As a result, TM-polarized light can be easily generated, and hence the reliability of the near-field light generating device is enhanced.

In the optically-assisted magnetic recording device 1 of the present embodiment, erroneous recording due to the generation of unnecessary near-field light is suppressed and unstable operation of the semiconductor laser device 10 owing to heat generated from the magnetic field generator 50 is also suppressed. This improves the reliability and life of the optically-assisted magnetic recording device 1.

Second Embodiment

Figure 8:
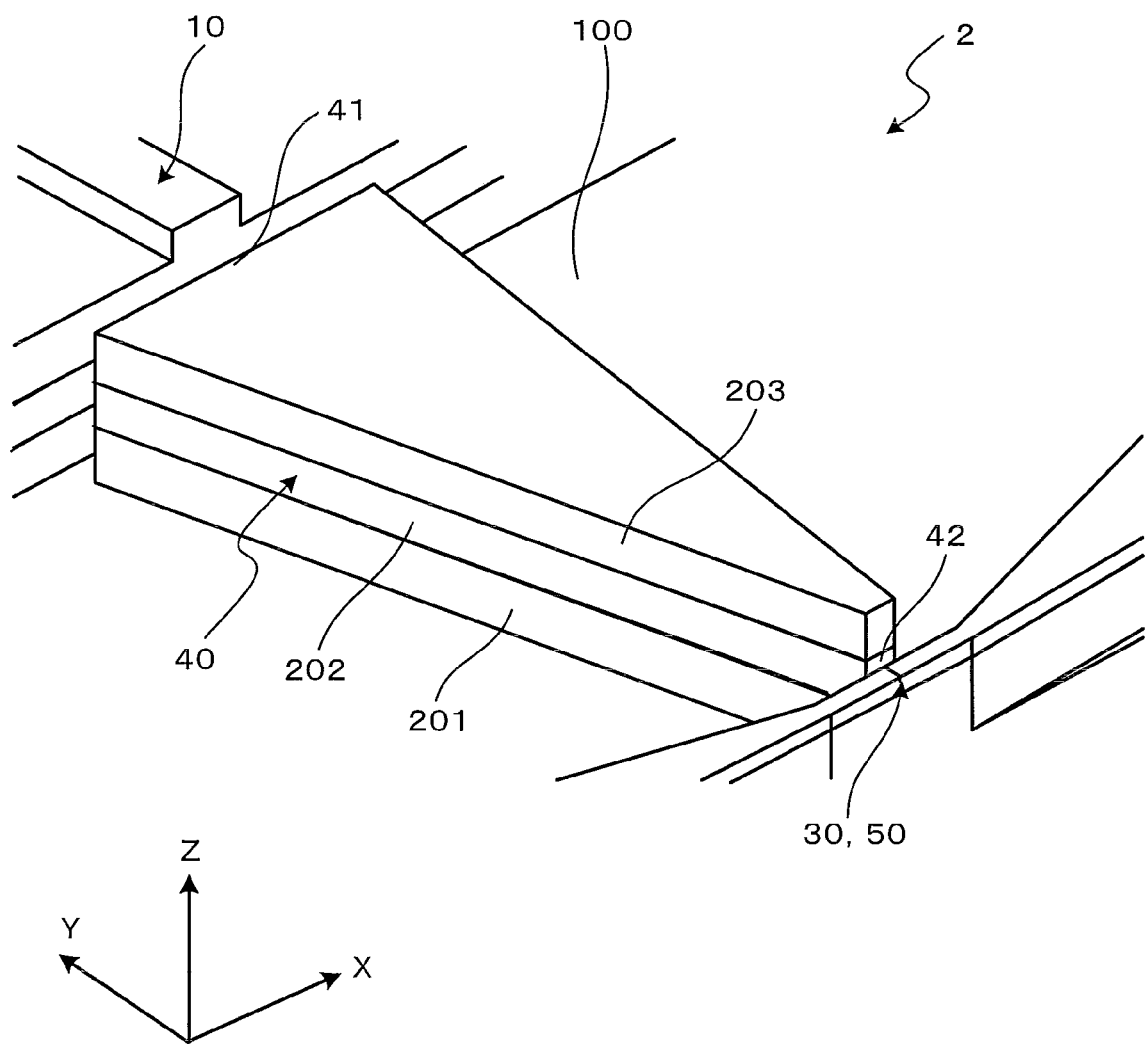
FIG. 8 is a partial enlarged perspective view of an optically-assisted magnetic recording device of Second Embodiment of the present invention.

Referring to FIG. 8, an optically-assisted magnetic recording device 2 of Second Embodiment will be described. Components having the same arrangements and functions as those in the optically-assisted magnetic recording device 1 of First Embodiment will be denoted by the same reference numbers and will not be described again.

The optically-assisted magnetic recording device 2 includes a substrate 100, a semiconductor laser device 10, a near-field light generating device which includes an optical absorption waveguide 40 and a near-field light generator 30 and is formed on the same plane of the substrate 100 as the semiconductor laser device 10, and a magnetic field generator 50. The arrangements and dispositions of the semiconductor laser device 10, the near-field light generator 30, and the magnetic field generator 50 are identical with those described in connection with the optically-assisted magnetic recording device 1 of First Embodiment.

Since the material and thickness of each layer of the optical absorption waveguide 40 are identical with those of the optical absorption waveguide 20 of First Embodiment, the description is not repeated again. A light incident part 41 of the optical absorption waveguide 40 is provided to oppose to an emission facet 13 of the semiconductor laser device 10 (i.e. provided to be perpendicular to the direction of light emission from the emission facet 13). Therefore the light emitted from the emission facet 13 of the semiconductor laser device 10 is introduced into the optical absorption waveguide 40 via the light incident part 41.

The optical absorption waveguide 40 has a light emission part 42 on the side opposite to the light incident part 41. The light incident to the light incident part 41 passes through the optical absorption waveguide 40 and is emitted from the light emission part 42. With this, TE-polarized light is suppressed, and the light emission part 42 of the optical absorption waveguide 40 emits only a TM-polarized light.

The light incident part 41 is wider than the ridge 111 of the semiconductor laser device 10, i.e. wider than the cavity. This structure makes the light couple between the semiconductor laser device 10 and the optical absorption waveguide 40 more efficiently than that of the optical absorption waveguide 20 of First Embodiment. Furthermore, the light emission part 42 is narrower than the ridge 111 of the semiconductor laser device 10, i.e. narrower than the cavity. Therefore the optical spot size at the light emission part 42 is smaller than that at the emission facet 13 of the semiconductor laser device 10, resulting in the strong intensity light irradiated to the near-field light generator 30. In other words, the optical absorption waveguide 40 is able to focus the light emitted by the semiconductor laser device 10 to a smaller spot size and hence the efficiency is improved compared to the optical absorption waveguide 20.

Third Embodiment

Figure 9:
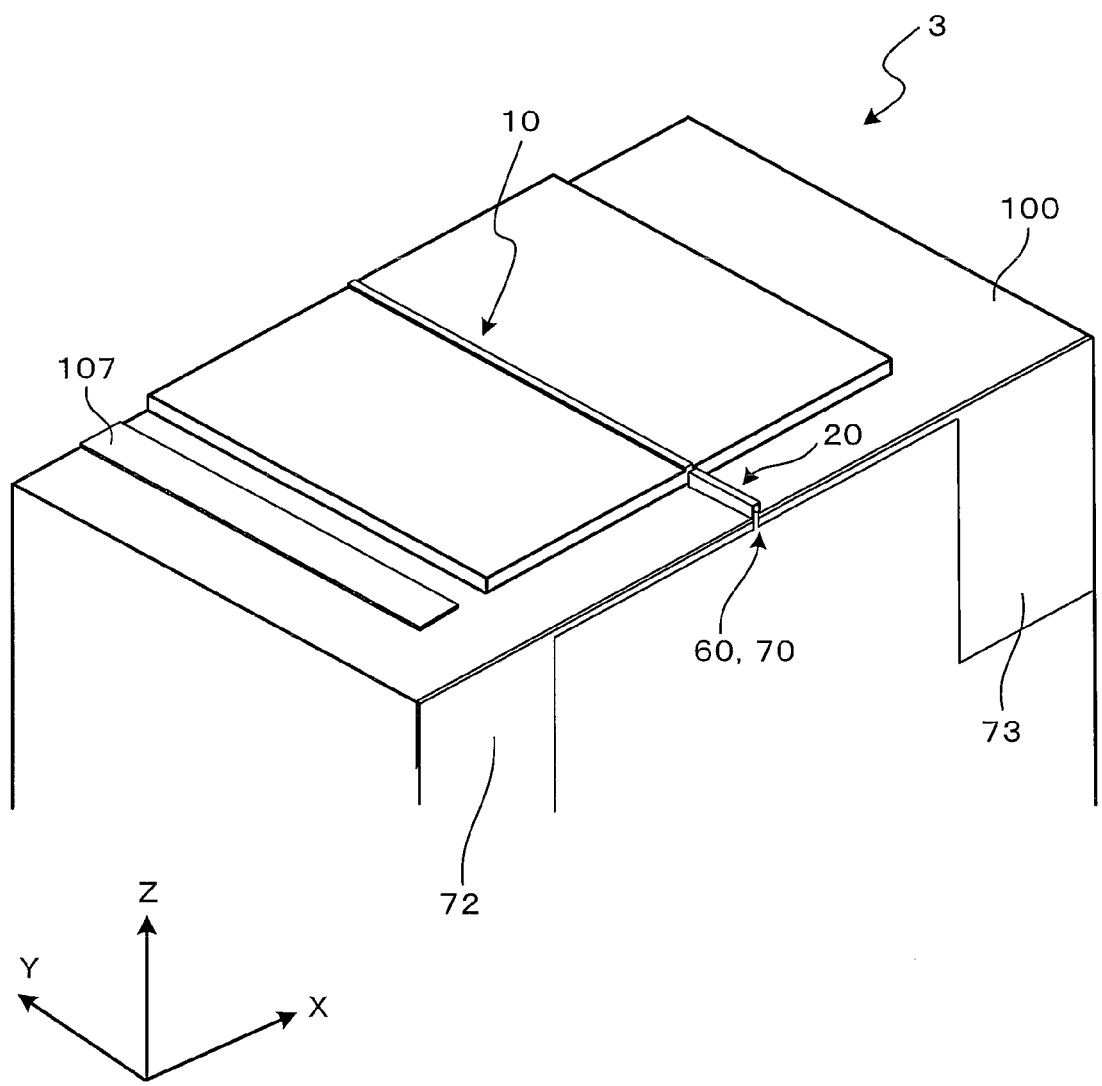
FIG. 9 is a perspective view of an optically-assisted magnetic recording device of Third Embodiment of the present invention.

Now, referring to FIG. 9 and FIG. 10, an optically-assisted magnetic recording device 3 of Third Embodiment will be described. Components having the same arrangements and functions as those in the optically-assisted magnetic recording device 1 or 2 of First or Second Embodiment will be denoted by the same reference numbers and will not be described again.

The optically-assisted magnetic recording device 3 includes a substrate 100, a semiconductor laser device 10, a near-field light generating device which includes an optical absorption waveguide 20 and a near-field light generator 60 and is formed on the same plane of the substrate 100 as the semiconductor laser device 10, and a magnetic field generator 70.

<Near-Field Light Generator>

Figure 10:
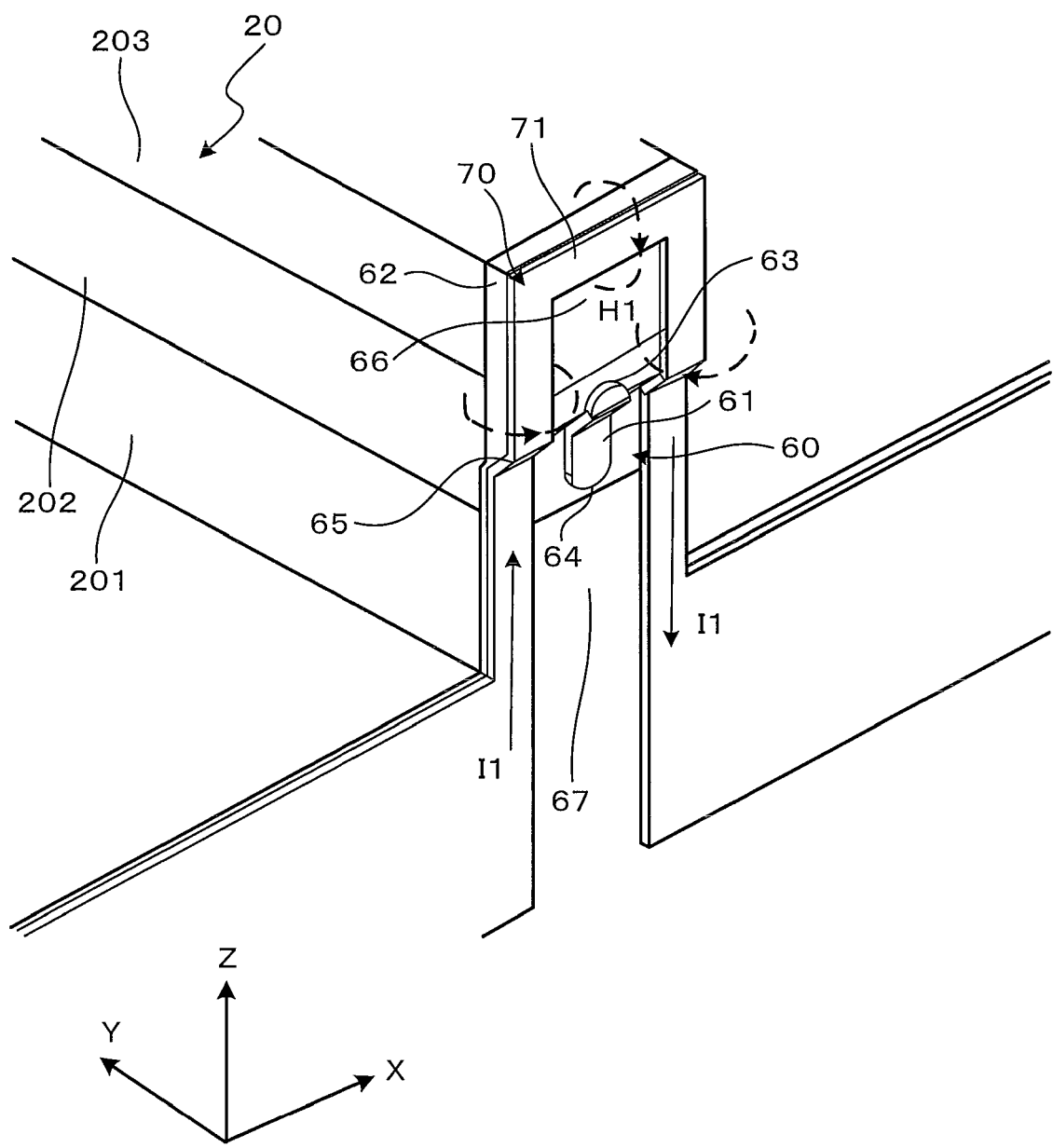
FIG. 10 is a perspective view of a near-field light generating device and a magnetic field generator in the optically-assisted magnetic recording device of FIG. 9.

As shown in FIG. 10, the near-field light generator 60 is composed of: an insulating layer 62 which is formed on the light emitting surface 22 (see FIG. 2) of the optical absorption waveguide 20 and is made of a material which does not absorb the light emitted from the semiconductor laser device 10; and a scatterer 61 which is a metal film formed on the insulating layer 62. The scatterer 61 has a stick-shaped structure having arcs 63 and 64 on the both ends, when viewed in the XZ in-plane direction of FIG. 10. The long axis direction of the scatterer 61 is in parallel to the z direction. In the xz in-plane, the length of the scatterer 61 in the long axis direction (i.e. the length from the apex of the arc 63 to the apex of the arc 64) is 100 nm, and the length in the short axis direction is 25 nm. The curvature radius of each of the arcs 63 and 64 is 25 nm.

The insulating layer 62 has a stepped surface 65. Above the stepped surface 65 formed is an upper surface 66 whereas below the stepped surface 65 formed is a lower surface 67. The stepped surface 65 is inclined at an angle of 45 degrees. The height difference between the upper surface 66 and the lower surface 67 is 30 nm.

One arc 63 of the scatterer 61 is formed on the upper surface 66, whereas the other arc 64 is formed on the lower surface 67. The arc 63 overlaps the absorption layer 202 of the optical absorption waveguide 20 in the y direction in FIG. 10. For the excitation of surface plasmon, both arcs 63 and 64 are preferably formed to overlap the absorption layer 202 in the y direction.

From the light emitting surface 22 of the optical absorption waveguide 20, light polarized in the z direction (electric field in z direction) is emitted toward the near-field light generator 60. When the near-field light generator 60 receives the light polarized in the z direction, surface plasmon resonance occurs in the scatterer 61, with the result that intense localized near-field light is generated at the arcs 63 and 64.

The material, shape, and disposition of the scatterer 60 may be designed to be different from the above, because they are determined in accordance with conditions of excitation of surface plasmon with a desired wavelength and point of generation of near-field light.

<Magnetic Field Generator>

As shown in FIG. 10, the magnetic field generator 70 is formed on the insulating layer 62. The magnetic field generator 70 composed of the conductive layer 71 is formed to be U-shaped and surrounds the scatterer 60. The end parts 72 and 73 of this conductive layer 71 are connected to an external power source (not illustrated), respectively, so that current supply to the conductive layer 71 is possible. That is to say, in the present embodiment, the magnetic field generator 70 composed of the conductive layer 71 is formed in the vicinity of the near-field light generator 60.

When the current is supplied to the conductive layer 72 in the direction indicated by the arrow I1 in FIG. 10, a magnetic field indicated by three arrows H1 is generated in the vicinity of the scatterer 60, according to Ampere's law.

Figure 11:
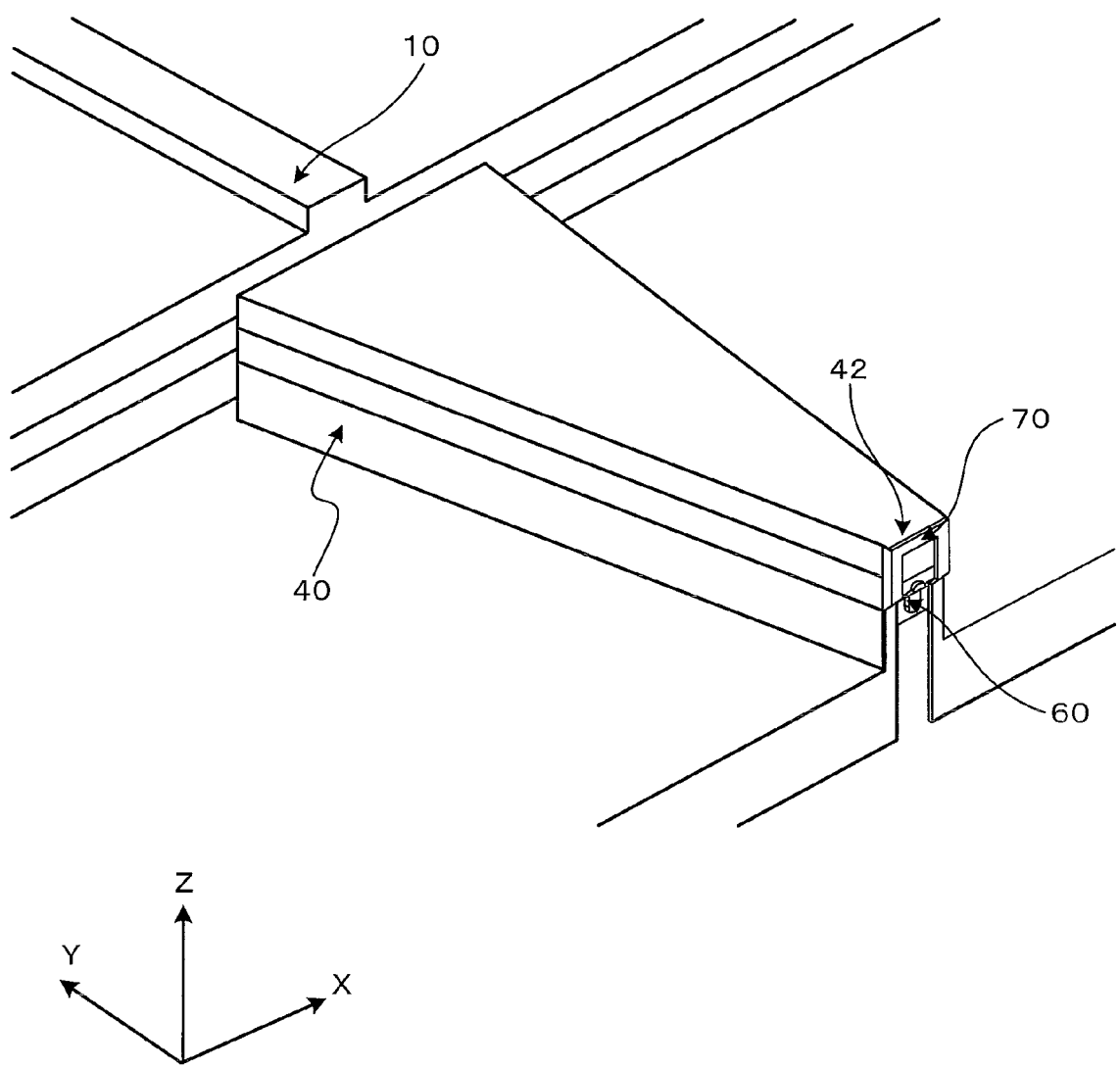
FIG. 11 is a partial enlarged perspective view of the optically-assisted magnetic recording device of FIG. 9.
Figure 12:
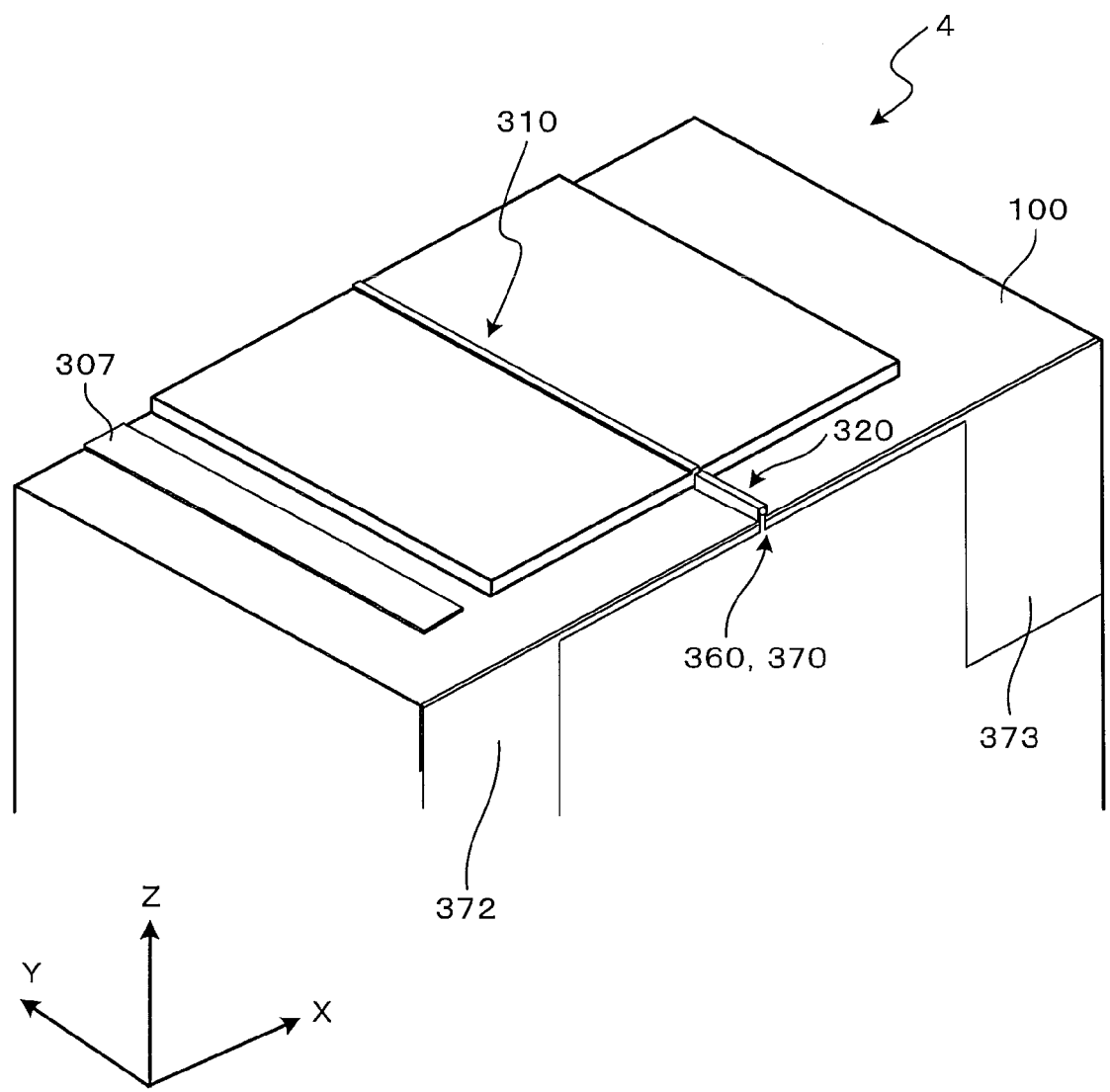
FIG. 12 is a perspective view of an optically-assisted magnetic recording device of Fourth Embodiment of the present invention.

In the optically-assisted magnetic recording device 3 of Third Embodiment, the optical absorption waveguide 40 of Second Embodiment may be used instead of the optical absorption waveguide 20. In this case, as shown in FIG. 11, the near-field light generator 60 and the magnetic field generator 70 are formed at the light emission part 42.

Fourth Embodiment

Now, an optically-assisted magnetic recording device 4 of Fourth Embodiment will be described with reference to FIGS. 12-17. Components having the same arrangements and functions as those in the optically-assisted magnetic recording device 1, 2, or 3 of First, Second or Third Embodiment will be denoted by the same reference numbers and will not be described again.

The optically-assisted magnetic recording device 4 includes a substrate 100, a semiconductor laser device 310, a near-field light generating device which includes an optical absorption waveguide 320 and a near-field light generator 360 and is formed on the same plane of the substrate 100 as the semiconductor laser device 310, and a magnetic field generator 370.

<Overall Structure>

The optically-assisted magnetic recording device 4 has a GaAs (gallium arsenide) substrate 100. On the substrate 100 formed is the semiconductor laser device 310. The semiconductor laser device 310 has a cavity, and the two facet mirrors are formed on the both ends of the cavity. Along the direction of light emission from one facet mirror, a light incident part of the optical absorption waveguide 320 is formed in the vicinity of the facet mirror to oppose this facet mirror. On the optical absorption waveguide 320, a light emission part is formed on the side opposite to the light incident part. Along the direction of light emission from this light emission part, the near-field light generator 360 and the magnetic field generator 370 are formed in the vicinity of the light emission part of the optical absorption waveguide 320.

<Semiconductor Laser Device>

Figure 13:
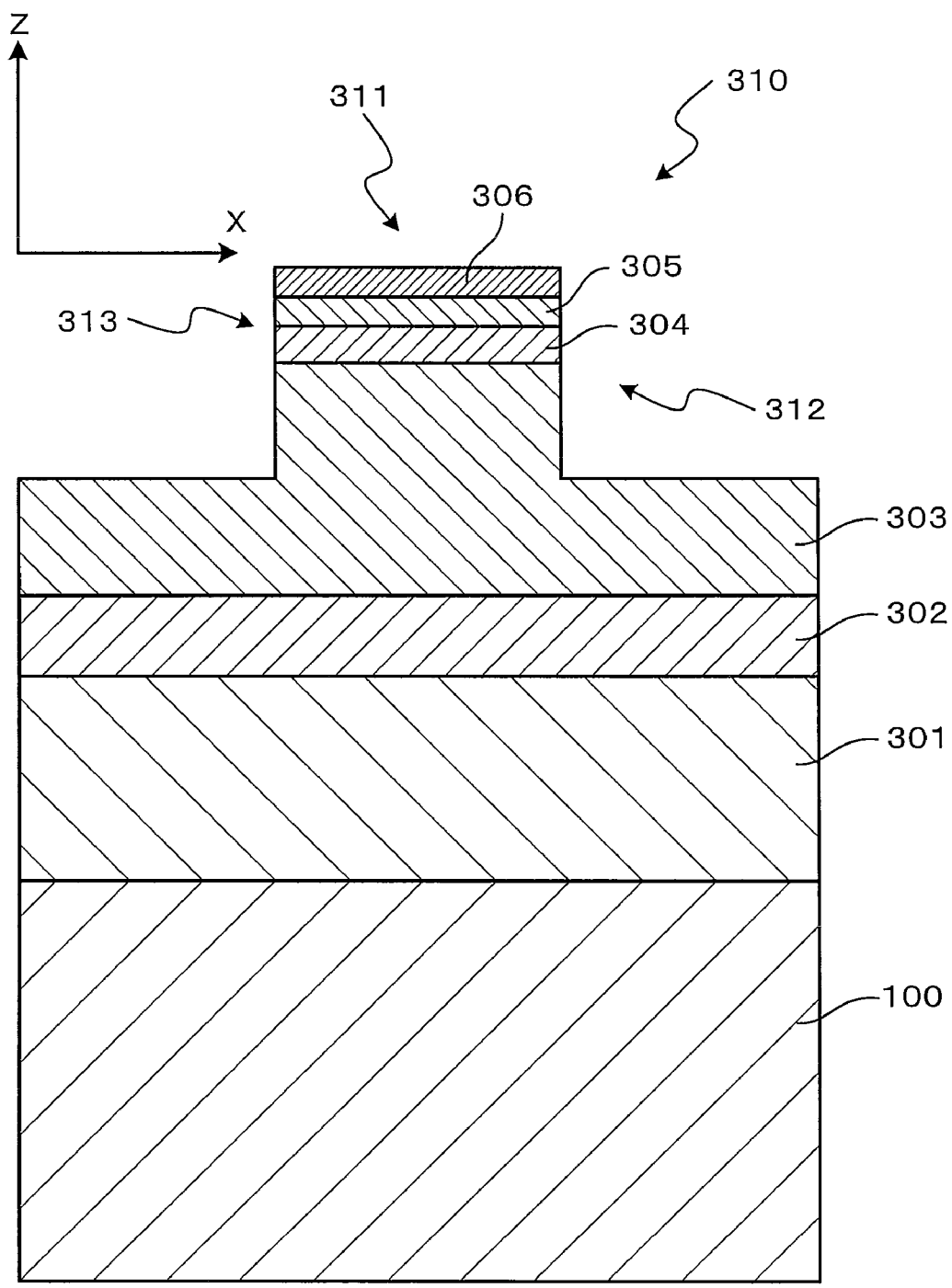
FIG. 13 is a cross section of a semiconductor laser device in the optically-assisted magnetic recording device of FIG. 12.

Referring to FIG. 13, the structure of the semiconductor laser device 310 will be described. On the n-GaAs substrate 100, the following layers are deposited in this order: an n-$(Al_xGa_{1-x})_{1-y}In_yP$ (x=0.7, y=0.49) n-cladding layer 301, a quantum well active layer 302 consists of $In_xGa_{1-x}P$ (x=0.52) well layer/$(Al_xGa_{1-x})_{1-y}In_yP$ (x=0.5, y=0.49) barrier layer, a p-$(Al_xGa_{1-x})_{1-y}In_yP$ (x=0.7, y=0.49) p-cladding layer 303, a p-$In_xGa_{1-x}P$ (x=0.49) p-buffer layer 304, and a p-GaAs contact layer 305. The n-cladding layer 301 and the p-cladding layer 303 are both 1.2 μm thick, and the number of well layers in the active layer 302 is at least one, preferably three. The barrier layers and the well layers are alternately provided, and the both edges of the active layer 302 are barrier layers. Each well layer is 5.5 nm thick, each barrier layer is 7 nm thick, and the p-GaAs contact layer 305 is 20 nm thick. The aforesaid layers may be made of materials other than the above.

The semiconductor laser device 310 has a non-buried ridge-type waveguide structure in the same manner as the semiconductor laser device 10 of First Embodiment. From the surface of the semiconductor laser device 310 to the p-AlGaInP p-cladding layer 303, grooves 312 and 313 are formed to shape a ridge 311 defining a cavity.

The grooves 312 and 313 do not reach the surface of the quantum well active layer 302. In the space from the bottom surfaces of the grooves 312 and 313 to the surface of the quantum well active layer 302, another semiconductor layer (p-AlGaInP p-cladding layer 303) remains.

The active layer 302 of the semiconductor laser device 310 of the present embodiment has a compression strain in a direction perpendicular to the confinement direction of the quantum well in its well layer. For this reason, since the gain in the lasing is larger in TE-polarized light than in TM-polarized light as discussed above, the laser light of the semiconductor laser device 310 is TE-polarized light. The wavelength of the laser light is about 630 nm.

The cavity facets of the semiconductor laser device 310 are mirrors. The flat surfaces of the mirrors are preferably formed by etching. Alternatively, the flat surfaces may be formed by a method such as cleavage. On the surfaces of the mirrors, a dielectric multi-layer film and a metal film may be formed to adjust the reflectance. In the present embodiment, the semiconductor laser device 310 emits laser light from an emission facet 316 facing the optical absorption waveguide 320.

On the n-GaAs substrate 100 and the p-GaAs contact layer 305, an n-electrode 307 and a p-electrode 306 are formed, respectively. A positive voltage is applied to the p-electrode 306 by an external power source (not illustrated). The n-electrode is at ground. When a current higher than the lasing threshold is injected, the semiconductor laser device 310 emits the laser light into outside.

The light emitted from the emission facet has a predetermined divergence angle because of the diffraction caused by the waveguide structure in the semiconductor laser device 310. The divergence angle is on the same level as that of the semiconductor laser device 10. The light emitted from the emission facet includes a TM-polarized light generated by spontaneous emission, in addition to the TE-polarized light generated by the lasing.

<Optical Absorption Waveguide>

Figure 14:
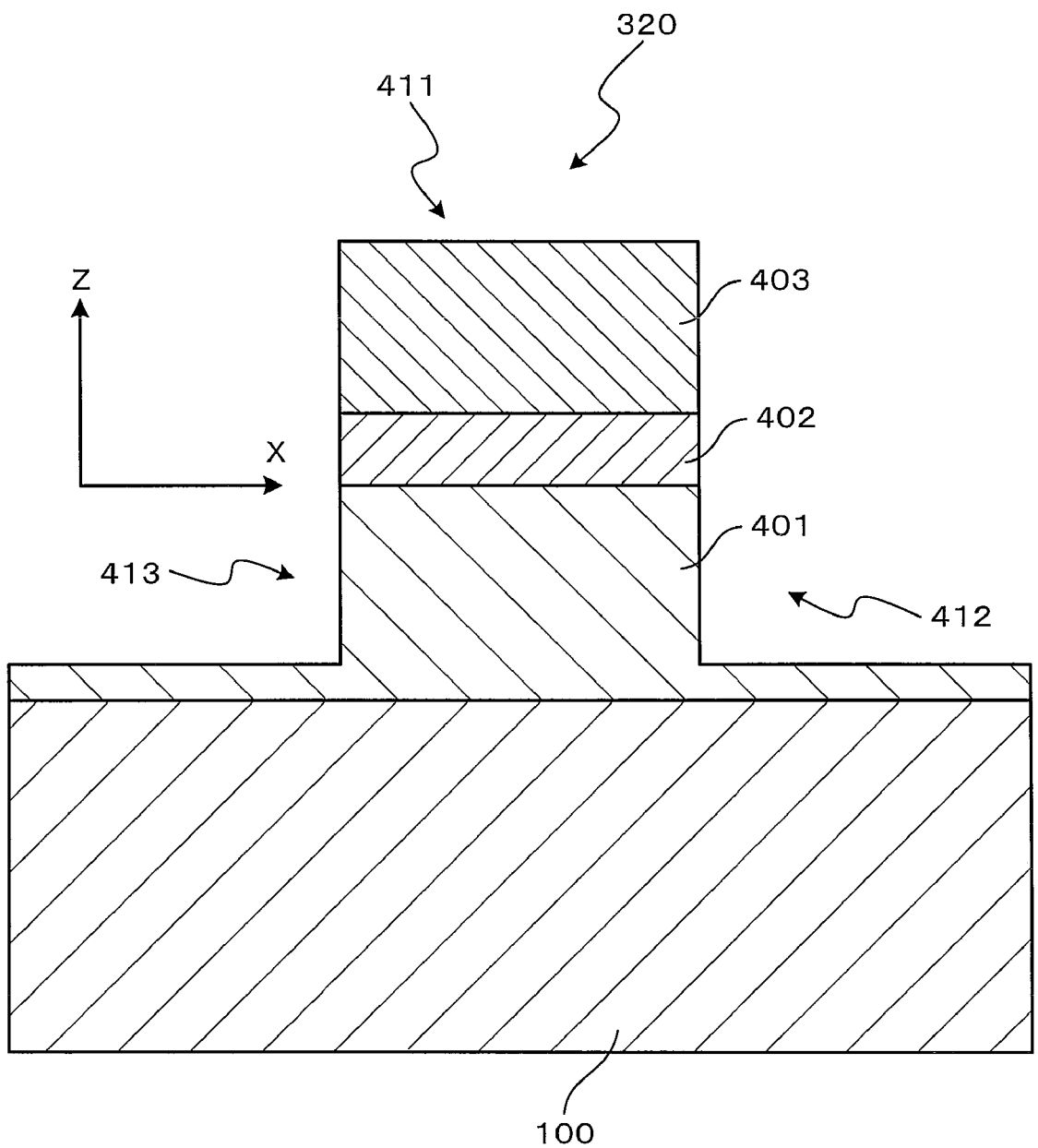
FIG. 14 is a cross section of an optical absorption waveguide in the optically-assisted magnetic recording device of FIG. 12.

The structure of the optical absorption waveguide 320 will be described with reference to FIG. 14. The optical absorption waveguide 320 is formed by depositing the following layers on the n-GaAs substrate 100 in this order: a lower (AlxGa1−x)1−yInyP (x=0.7, y=0.49) cladding layer 401, a quantum well absorption layer 402 consists of InxGa1−xP (x=0.45) well layer/(AlxGa1−x)1−yInyP (x=0.5, y=0.49) barrier layer, and an upper (AlxGa1−x)1−yInyP (x=0.7, y=0.49) cladding layer 403. The cladding layer 401 and the cladding layer 403 are 1.2 µm thick. The absorption layer 402 has at least one quantum well. Each well layer is 8.0 nm thick and each barrier layer is 7 nm thick. The number of well layers is preferably 10 or more.

Since the materials of the aforesaid layers are mere examples, the layers may be made by materials other than the above. The optical absorption waveguide 320 has a striped structure as shown in FIG. 14. In the waveguide 320, grooves 412 and 413 are formed so that a ridge 411 is formed from the surface of the optical absorption waveguide 320 to the lower AlGaInP p-cladding layer 401.

The quantum well absorption layer 402 has a tensile strain in a direction perpendicular to the confinement direction of the quantum well. Therefore, in the valence band of the quantum well absorption layer 402, LH1 is at the first quantum level of the valence band. When the optical absorption waveguide 320 receives light having energy higher than the energy gap between CB1 and LH1 of the quantum well absorption layer 902, TM-polarized light is mainly absorbed by the excitation between CB1 and LH1. When light having higher energy than the energy gap between CB1 and HH1 is irradiated to the optical absorption waveguide 320, TE-polarized light is mainly absorbed due to the excitation between CB1 and HH1.

In the present embodiment, HH1 of the quantum well absorption layer 402 has a lower energy level than LH1, with the result that the energy between CB1 and HH1 is larger than the energy between CB1 and LH1. Therefore, as the light with the wavelength (618 nm to 634 nm) equivalent to an energy larger than CB1-LH1 and smaller than CB1-HH1 (light with the wavelength of 630 nm, for example) is applied, the optical absorption waveguide 320 absorbs mainly TM-polarized light.

Figure 15:
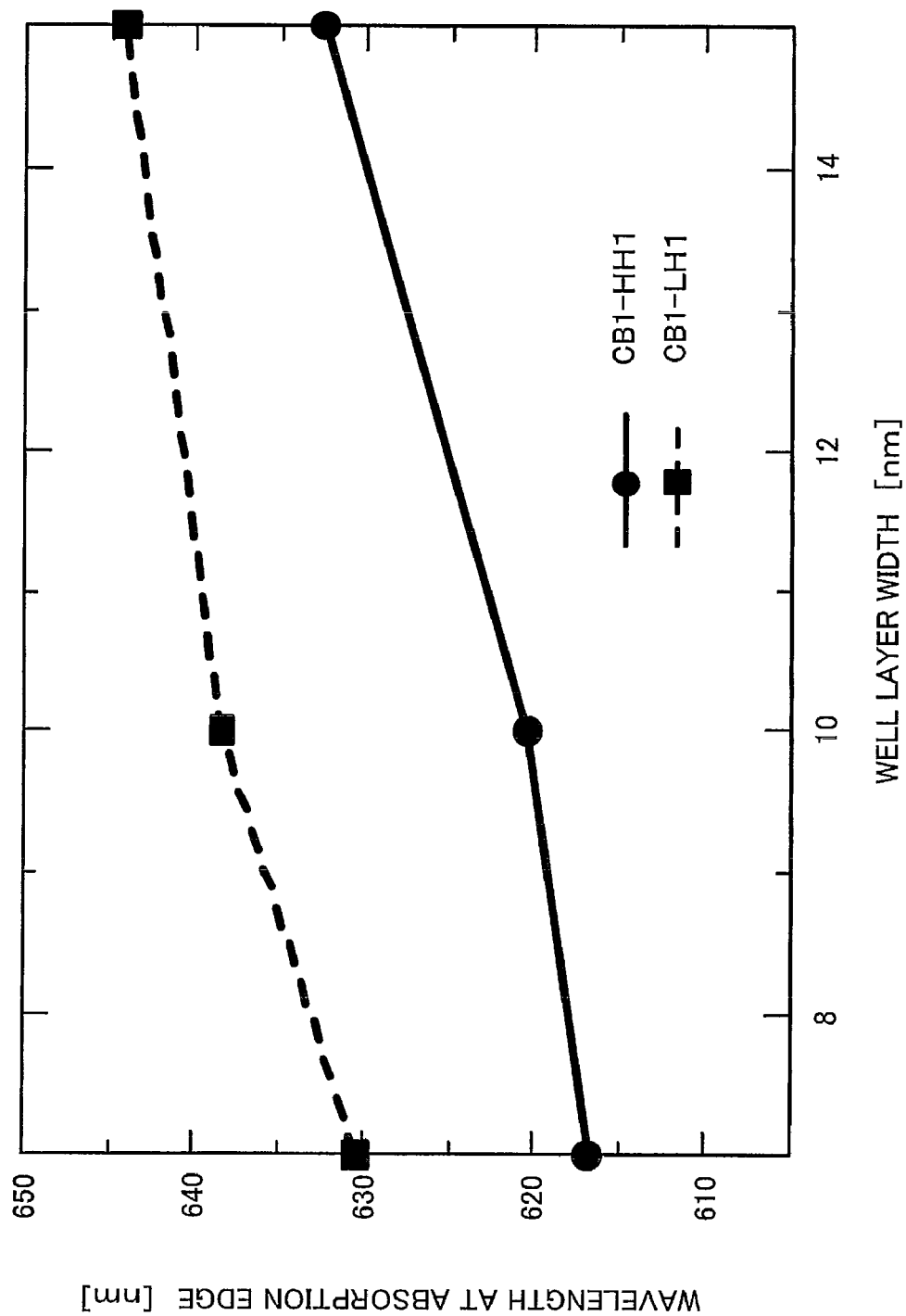
FIG. 15 is a graph showing the well width dependency of the absorption edge of the optical absorption waveguide in the optically-assisted magnetic recording device of FIG. 12.

FIG. 15 shows a result of numerical calculations of the well layer width dependency of HH1 and LH1 in the quantum well consists of InxGa1−xP (x=0.45) well layer (AlxGa1−x)1−yInyP (x=0.5, y=0.49) barrier layer. As shown in FIG. 15, HH1 and LH1 vary in accordance with the width of the well layer. Since the well width of the optical absorption waveguide 320 is 8.0 nm, an energy equivalent to the light wavelength of 630 nm falls within the range between HH1 and LH1. Therefore, when the light of 630 nm is irradiated to the optical absorption waveguide 360, TM-polarized light is selectively absorbed strongly. Furthermore, as shown in FIG. 15, when the width of the well layer falls within the range between 7.0 nm and 15 nm, an energy equivalent to the light wavelength of 630 nm falls within the range between HH1 and LH1, with the result that TM-polarized light is selectively absorbed strongly.

The light incident part of the optical absorption waveguide 320 is disposed to oppose the emission facet of the semiconductor laser device 310. Therefore the light emitted from the emission facet of the semiconductor laser device 310 is introduced into the optical absorption waveguide 320 via the light incident part.

The optical absorption waveguide 320 has the light emission part on the side opposite to the light incident part. The light incident to the optical absorption waveguide 320 from the light incident part passes through the optical absorption waveguide 320 and is emitted from the light emission part. Therefore, provided that the energy of laser light emitted from the semiconductor laser device 310 is between (i) an energy within CB1-LH1 (which is in this case the first quantum level of the valence band) of the optical absorption waveguide 320 and (ii) an energy within CB1-HH1 (which is in this case the second quantum level of the valence band) of the waveguide 320, the light emission part of the optical absorption waveguide 320 emits only TE-polarized light and this light is irradiated to the near-field light generator 360, even of the laser light includes a TM-polarized light component.

<Near-Field Light Generator>

Figure 16:
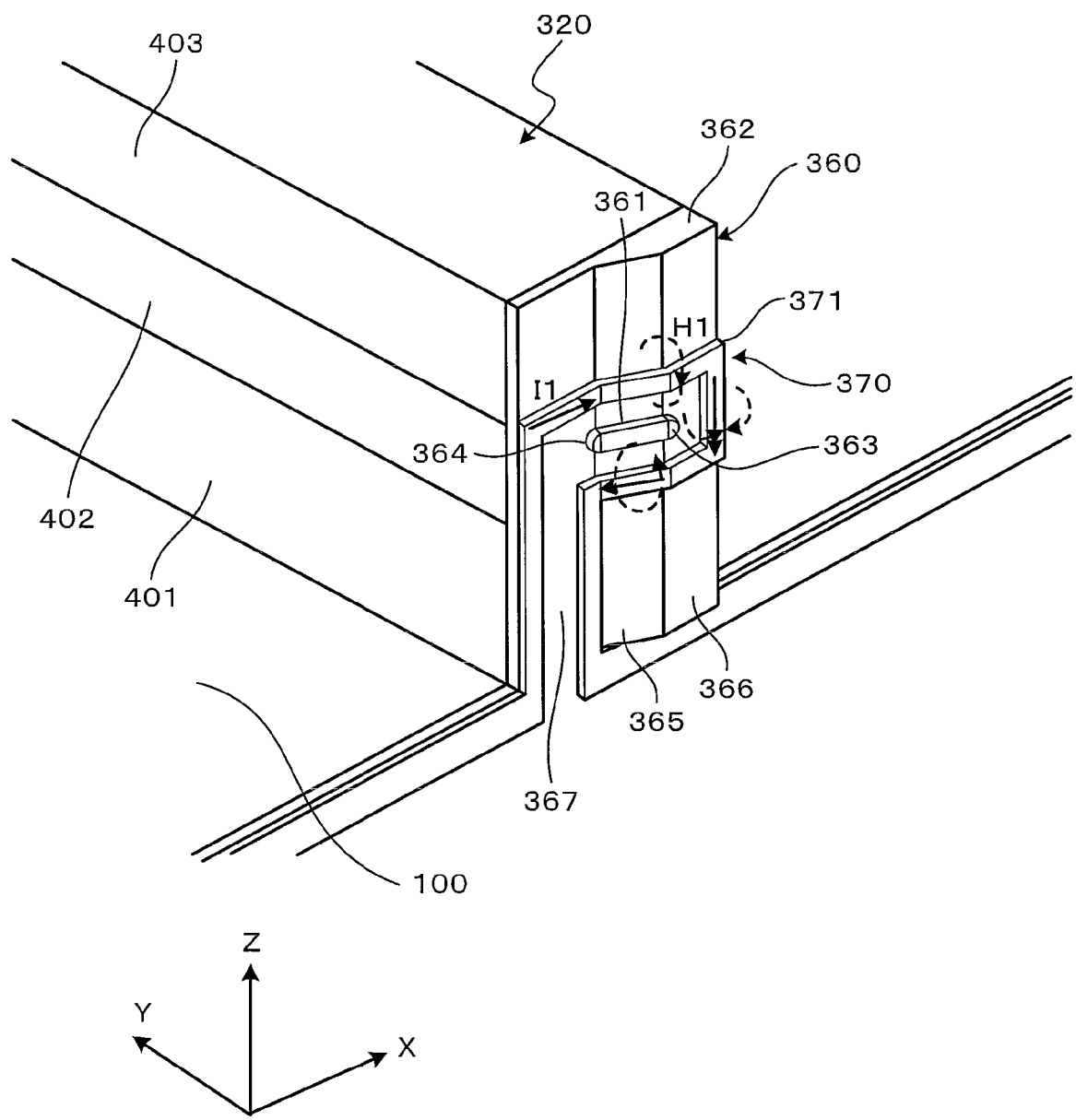
FIG. 16 is a perspective view of a near-field light generating device and a magnetic field generator in the optically-assisted magnetic recording device of FIG. 12.
Figure 17:
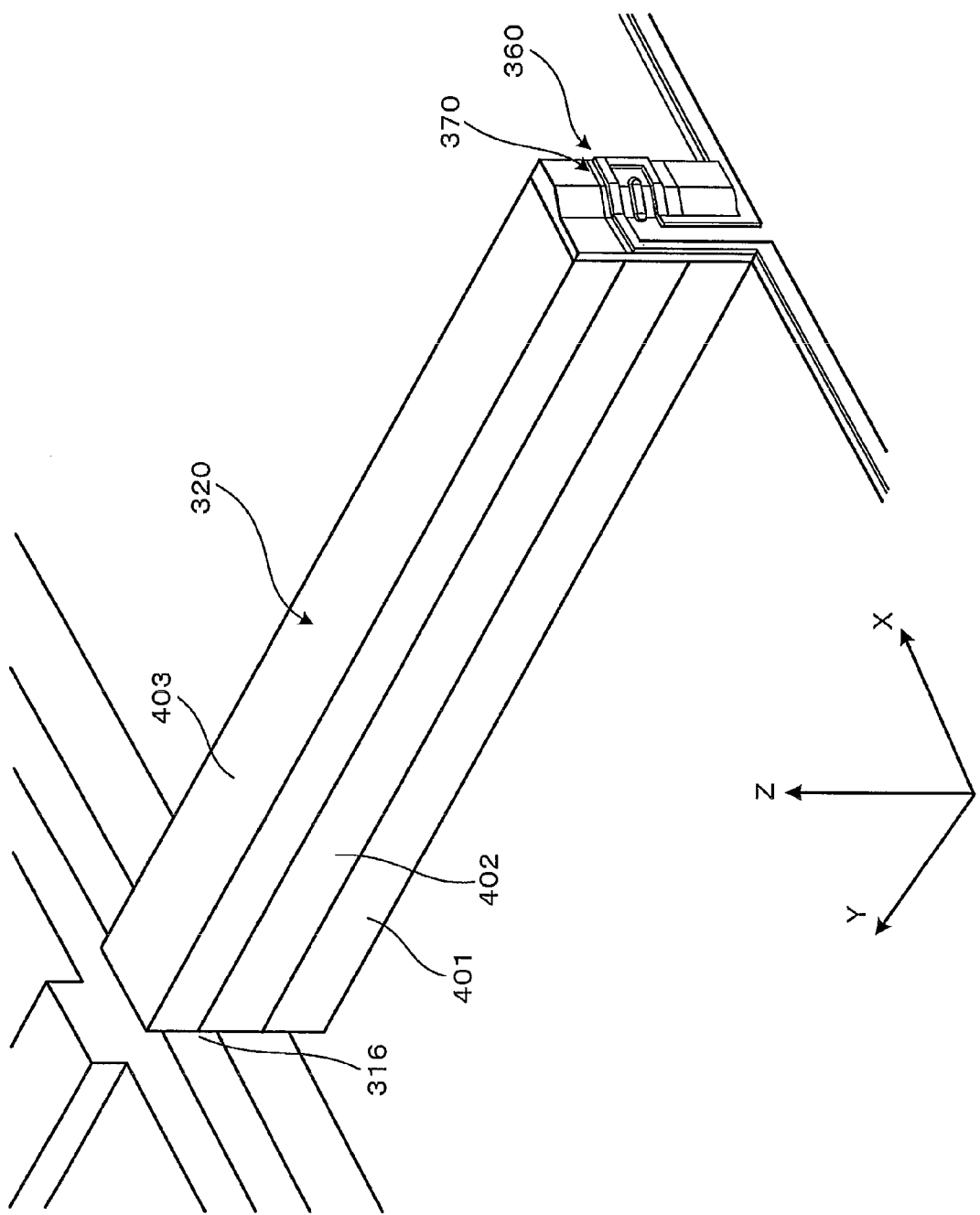
FIG. 17 is a partial enlarged perspective view of the optically-assisted magnetic recording device of FIG. 12.

As shown in FIG. 16 and FIG. 17, the near-field light generator 360 is composed of an insulating layer 362 which is formed on the light emitting surface of the optical absorption waveguide 320 and made of a material which does not absorb laser light from the semiconductor laser device 310 and a scatterer 361 which is a metal film formed on the insulating layer 362. The scatterer 361 has a stick-shaped structure having arcs 363 and 364 on its respective edges, when viewed in the xz in-plane direction of FIG. 16. The long axis direction of the scatterer 361 is in parallel to the x direction. In the xz in-plane, the length of the scatterer 361 in the long axis direction (i.e. the length from the apex of the arc 363 to the apex of the arc 364) is 100 nm, and 25 nm in the short axis direction (z direction). The curvature radius of each of the arcs 363 and 364 is 25 nm.

The insulating layer 362 is formed with a stepped surface 365. On the right side of the stepped surface 365 is an upper surface portion 366, and on the left side of the surface 365 is a lower surface portion 367. The stepped surface 365 is inclined at an angle of 45 degrees. The difference in height between the upper surface portion 366 and the lower surface portion 367 is 30 nm.

One arc 363 of the scatterer 361 is formed on the upper surface portion 366, whereas the other arc 364 is formed on the lower surface portion. The arcs 363 and 364 are formed to overlap the central axis of the absorption layer 402 of the optical absorption waveguide 320. For the excitation of surface plasmon, preferably the arcs 363 and 364 overlap the absorption layer 402.

From the light emitting surface 322 of the optical absorption waveguide 320, light polarized in the x direction (the electric field in x direction) is emitted toward the near-field light generator 360. When the near-field light generator 360 receives the light polarized in the x direction, surface plasmon resonance occurs on the scatterer 361, with the result that intense localized near-field light is generated at the arc 363 and 364.

The material, shape, and disposition of the scatterer 361 may be different from the above, because they are determined in accordance with conditions of excitation of surface plasmon with a desired wavelength and point of generation of near-field light. It is noted that the stepped surface 365 is formed in order to dispose the arc 363 to be closer to the magnetic recording layer than the arc 364 so that the near-field light generated around the arc 363 contributes to the magnetic recording in greater degree than the near-field light generated around the arc 364. The stepped surface 365 is tilted in order to further ensure the generation of plasmon.

<Magnetic Field Generator>

As shown in FIG. 16, the magnetic field generator 370 is formed on the insulating layer 362. The magnetic field generator 370 composed of a conductive layer 371 is formed to be U-shaped surrounding the scatterer 361. The end parts 372 and 373 of this conductive layer 371 are connected to an external power source (not illustrated), respectively, so that current supply to the conductive layer 371 is possible.

When the conductive layer 372 receives a current in the direction indicated by the arrow I1 in FIG. 16, a magnetic field indicated by three arrows H1 is generated in the vicinity of the scatterer 361, according to Ampere's law. That is to say, in the present embodiment, the magnetic field generator 370 composed of the conductive layer 371 is provided in the vicinity of the near-field light generator 360.

According to the present embodiment, the light emitted from the semiconductor laser device 310 is applied to the near-field light generator 360 via the optical absorption waveguide 320. Since the light applied to the near-field light generator 360 is substantially composed only of TE-polarized light, it is possible to restrain the generation of unnecessary near-field light due to TM-polarized light, thereby improving the reliability and stability of the near-field light generating device.

The active layer 302 of the semiconductor laser device 310 has a quantum well structure in which the well layer is strain-free or has a compression strain in a direction perpendicular to the confinement direction of the quantum well. The absorption layer 402 of the optical absorption waveguide 320 has a quantum well structure in which the well layer has a tensile strain in a direction perpendicular to the confinement direction of the quantum well. This allows the semiconductor laser device 310 to emit TE-polarized laser light, and allows the optical absorption waveguide 320 to absorb TM-polarized light.

In the well layer included in the absorption layer 402 of the optical absorption waveguide 320, the energy gap between the first quantum level of the valence band and the first quantum level of the conduction band is smaller than the energy of light corresponding to the wavelength of the laser light of the semiconductor laser device 310, and the energy gap between the second quantum level of the valence band and the first quantum level of the conduction band is larger than the energy of light corresponding to the wavelength of the laser light of the semiconductor laser device 310. This allows the optical absorption waveguide 320 to strongly absorb only a TM-polarized light component in the light emitted from the semiconductor laser device 310. Since it becomes easy to arrange the light emitted from the optical absorption waveguide 320 to have desired polarization properties, the reliability of the near-field light generating device can be improved.

Fifth Embodiment

Figure 18:
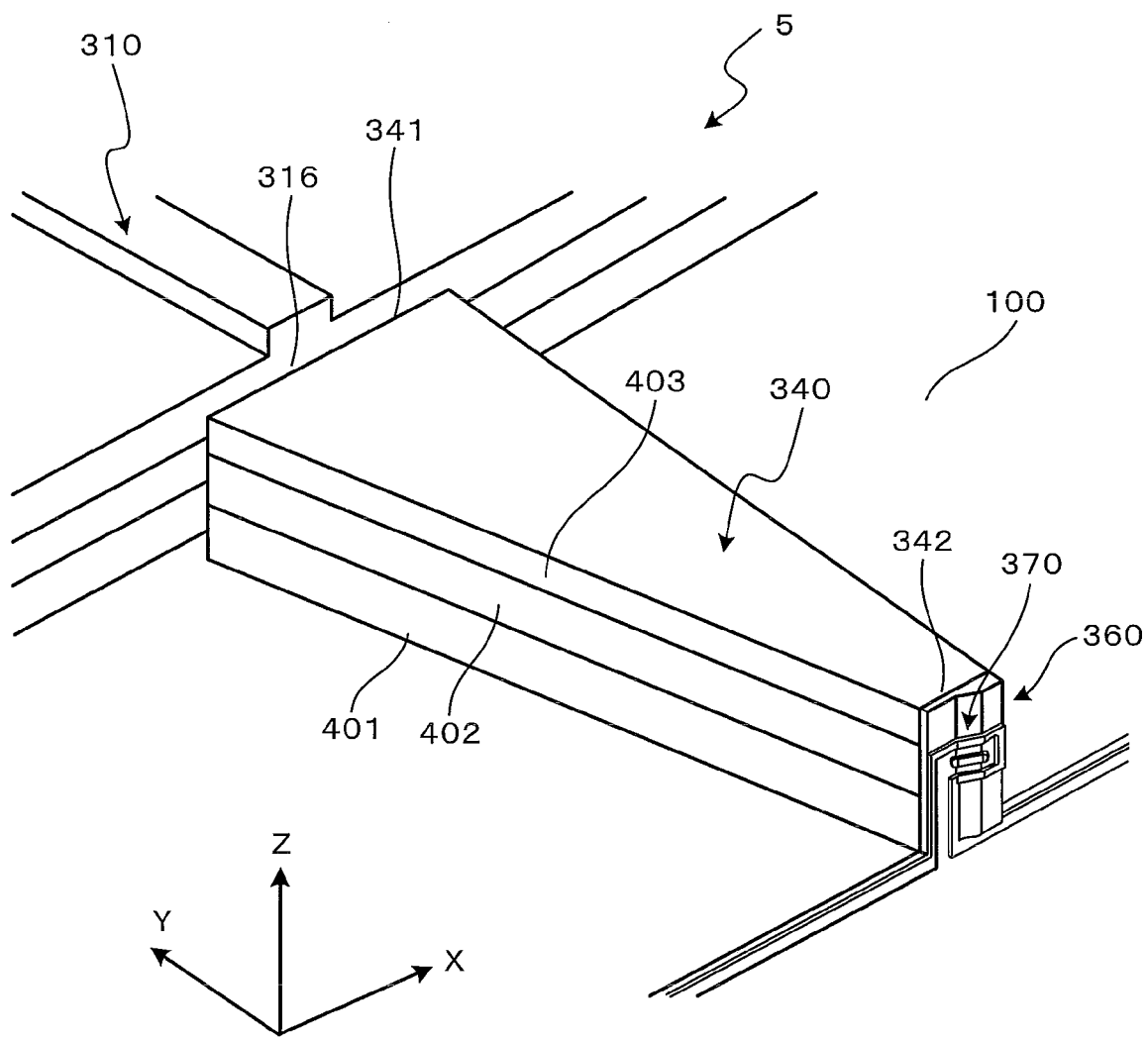
FIG. 18 is a partial enlarged perspective view of an optically-assisted magnetic recording device of Fifth Embodiment of the present invention.

Referring to FIG. 18, an optically-assisted magnetic recording device 5 of Fifth Embodiment will be described. Components having the same arrangements and functions as those in the optically-assisted magnetic recording device 1, 2, 3, or 4 of First, Second, Third, or Fourth Embodiment will be denoted by the same reference numbers and will not be described again.

The optically-assisted magnetic recording device 5 includes a substrate 100, a semiconductor laser device 310, a near-field light generating device which includes an optical absorption waveguide 340 and a near-field light generator 360 and is formed on the same plane of the substrate 100 as the semiconductor laser device 310, and a magnetic field generator 370. The semiconductor laser device 310, the near-field light generator 360, and the magnetic field generator 370 are arranged and disposed in the same manner as those of the optically-assisted magnetic recording device 4 of Fourth Embodiment.

The optical absorption waveguide 340 is identical with the optical absorption waveguide 320 of Fourth Embodiment in terms of the deposition of films, and the description thereof is not repeated. A light incident part 341 of the optical absorption waveguide 340 is disposed to oppose an emission facet 316 of the semiconductor laser device 310 (i.e. to be orthogonal to the direction of light emission from the emission facet 316. Therefore the light emitted from the emission facet 316 of the semiconductor laser device 310 is introduced into the optical absorption waveguide 340 via the light incident part 341.

The optical absorption waveguide 340 includes a light emission part 342 on the side opposite to the light incident part 341. The light incident to the light incident part 341 passes through the optical absorption waveguide 340 and is emitted from the light emission part 342. Therefore even if the laser light has a TM-polarized light, the light emission part 342 of the optical absorption waveguide 340 emits only TE-polarized light.

The light incident part 341 is narrower than a ridge 311 of the semiconductor laser device 310, i.e. narrower than the cavity. Having this structure, the light coupling between the semiconductor laser device 310 and the optical absorption waveguide 340 is improved comparing with that of the optical absorption waveguide 320 of First Embodiment. The light emission part 342 is narrower than the ridge 311 of the semiconductor laser device 310, i.e. narrower than the cavity. Therefore the optical spot size at the light emission part 342 is smaller than the spot size at the emission facet 316 of the semiconductor laser device 310, and hence the power of light irradiated to the near-field light generator 360 is high. In other words, the beam radius of the light emitted from the semiconductor laser device 310 is effectively reduced, with the result that the efficiency of utilization of light is improved as compared to the optical absorption waveguide 320.

In the above-described embodiments, the active layer of the semiconductor laser device has a quantum well structure. In this regard, the effects of the aforesaid embodiments are also achievable when the active layer of the semiconductor laser device has a quantum wire structure or a quantum dot structure. In the above-described embodiments, the absorption layer of the optical absorption waveguide has a quantum well structure. In this regard, the effects of the aforesaid embodiments are also achievable when the absorption layer of the optical absorption waveguide has a quantum wire structure or a quantum dot structure. The light absorbing device may be a component different from the optical absorption waveguide (i.e. a component which does not have a waveguide structure).

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A near-field light generating device comprising:
a substrate;
a semiconductor laser device which is formed on the substrate and emits laser light polarized in a first direction;
a light absorbing device which is formed on the substrate to be close to a light emission facet of the semiconductor laser device and absorbs light polarized in a second direction orthogonal to the first direction; and
a near-field light generator which is formed on the substrate to be close to a light emission part of the light absorbing device, wherein
an active layer of the semiconductor laser device and an absorption layer of the light absorbing device both have a quantum well structure, in which (a) when a well layer in the active layer is strain-free or has a compression strain in a direction perpendicular to the confinement direction of the quantum well, a well layer in the absorption layer has a tensile strain in a direction perpendicular to the confinement direction of the quantum well, and (b) when the well layer in the active layer has a tensile strain in a direction perpendicular to the confinement direction of the quantum well, the well layer of the absorption layer has a compression strain in a direction perpendicular to the confinement direction of the quantum well.

2. The near field light generating device according to claim 1, wherein,
the light absorbing device is an optical absorption waveguide device having a waveguide structure.

3. The near-field light generating device according to claim 1, wherein,
an active layer of the semiconductor laser device has one of a quantum well structure, a quantum wire structure, and a quantum dot structure.

4. The near-field light generating device according to claim 1, wherein,
an absorption layer of the light absorbing device has one of a quantum well structure, a quantum wire structure, and a quantum dot structure.

5. The near-field light generating device according to claim 1, wherein,
in the well layer of the absorption layer in the light absorbing device, an energy gap between the first quantum level of the valence band and the first quantum level of the conduction band is smaller than an energy of light corresponding to a lasing wavelength of the semiconductor laser device, and an energy gap between the second quantum level of the valence band and the first quantum level of the conduction band is larger than the energy of the light corresponding to the lasing wavelength of the semiconductor laser device.

6. The near-field light generating device according to claim 2, wherein,
a light incident part of the optical absorption waveguide device which is close to the light emission facet of the semiconductor laser device is not narrower than a cavity of the semiconductor laser device, and the light emission part of the optical absorption waveguide device is narrower than the cavity of the semiconductor laser device.

7. An optically-assisted magnetic recording device comprising:
a near-field light generating device including: a substrate; a semiconductor laser device which is formed on the substrate and emits laser light polarized in a first direction; a light absorbing device which is formed on the substrate to be close to a light emission facet of the semiconductor laser device and absorbs light polarized in a second direction orthogonal to the first direction; and a near-field light generator formed on the substrate to be close to a light emission part of the light absorbing device; and
a magnetic field generator formed in the vicinity of the near-field light generator in the near-field light generating device, wherein
an active layer of the semiconductor laser device and an absorption layer of the light absorbing device both have a quantum well structure, in which (a) when a well layer in the active layer is strain-free or has a compression strain in a direction perpendicular to the confinement direction of the quantum well, a well layer in the absorption layer has a tensile strain in a direction perpendicular to the confinement direction of the quantum well, and (b) when the well layer in the active layer has a tensile strain in a direction perpendicular to the confinement direction of the quantum well, the well layer of the absorption layer has a compression strain in a direction perpendicular to the confinement direction of the quantum well.

* * * * *